(12) United States Patent
Tsutsui et al.

(10) Patent No.: US 8,606,172 B2
(45) Date of Patent: *Dec. 10, 2013

(54) CONTROL METHOD, CONTROL APPARATUS, DATA RECEIVING AND RECORDING METHOD, DATA RECEIVER AND RECEIVING METHOD

(75) Inventors: Shintaro Tsutsui, Tokyo (JP); Susumu Nagano, Kanagawa (JP); Yasushi Katayama, Tokyo (JP)

(73) Assignee: Sony Corporation, Tokyo (JP)

( * ) Notice: Subject to any disclaimer, the term of this patent is extended or adjusted under 35 U.S.C. 154(b) by 113 days.

This patent is subject to a terminal disclaimer.

(21) Appl. No.: 12/833,825

(22) Filed: Jul. 9, 2010

(65) Prior Publication Data

US 2010/0280933 A1    Nov. 4, 2010

Related U.S. Application Data

(60) Continuation of application No. 11/396,438, filed on Apr. 3, 2006, which is a division of application No. 10/694,458, filed on Oct. 27, 2003, now Pat. No. 7,076,205, which is a division of application No. 09/354,612, filed on Jul. 15, 1999, now Pat. No. 6,668,158.

(30) Foreign Application Priority Data

Jul. 16, 1998  (JP) ................................. P10-202360
Jul. 16, 1998  (JP) ................................. P10-202361
Jul. 16, 1998  (JP) ................................. P10-202362

(51) Int. Cl.
    *H04H 20/74*    (2008.01)
(52) U.S. Cl.
    USPC ...................................................... 455/3.02

(58) Field of Classification Search
    USPC ........ 455/424, 425, 456.5, 456.6, 561, 550.1,
                455/575.1, 2.01, 3.01, 3.02, 30.3, 3.05,
                455/3.06, 412.1; 725/39, 54, 87, 62, 63, 74,
                725/86, 135; 360/15, 18, 27, 55, 39;
                348/734, 14.04, 14.02; 705/51, 57, 404
    See application file for complete search history.

(56) References Cited

U.S. PATENT DOCUMENTS 4,199,791 A    4/1980  Corey
4,887,308 A    12/1989 Dutton
(Continued)

FOREIGN PATENT DOCUMENTS

EP    0 794 625 A2    9/1997
JP    5-258463        10/1993
(Continued)

OTHER PUBLICATIONS

Tsuneyuki Miyake, Japanese and European 8 companies, "HAVi" software for home networks is published, Nikkei Electronics, Nikkei BP, Jun. 15, 1998, vol. 718, pp. 37-38.

(Continued)

*Primary Examiner* — Yuwen Pan
*Assistant Examiner* — Ankur Jain
(74) *Attorney, Agent, or Firm* — Oblon, Spivak, McClelland, Maier & Neustadt, L.L.P.

(57) ABSTRACT

A data receiving and recording method and data receiver are provided for receiving data coded by a predetermined method and copyright information attached to the data. While recording the received data on a predetermined recording medium, the copyright information is recorded into a predetermined area of the recording medium. Preferably, the data consists of audio data of the song, lyrics data of the song and image data relating to the song and the copyright information is allotted respectively to the audio data, lyrics data and image data.

10 Claims, 19 Drawing Sheets

(56) References Cited

U.S. PATENT DOCUMENTS

| | | | |
|---|---|---|---|
| 4,943,865 A * | 7/1990 | Hales et al. | 386/224 |
| 5,003,591 A | 3/1991 | Kauffman et al. | |
| 5,063,610 A * | 11/1991 | Alwadish | 455/45 |
| 5,107,343 A | 4/1992 | Kawai | |
| 5,341,166 A | 8/1994 | Garr et al. | |
| 5,341,350 A | 8/1994 | Frank et al. | |
| 5,497,372 A | 3/1996 | Nankoh et al. | |
| 5,557,724 A * | 9/1996 | Sampat et al. | 725/43 |
| 5,572,442 A * | 11/1996 | Schulhof et al. | 709/219 |
| 5,721,878 A * | 2/1998 | Ottesen et al. | 725/87 |
| 5,768,539 A | 6/1998 | Metz et al. | |
| 5,777,997 A | 7/1998 | Kahn et al. | |
| 5,794,244 A | 8/1998 | Brosch et al. | |
| 5,798,785 A | 8/1998 | Hendricks et al. | |
| 5,820,384 A | 10/1998 | Tubman et al. | |
| 5,822,216 A * | 10/1998 | Satchell et al. | 700/232 |
| 5,862,260 A * | 1/1999 | Rhoads | 382/232 |
| 5,866,967 A | 2/1999 | Sasaki | |
| 5,918,213 A | 6/1999 | Bernard et al. | |
| 5,925,843 A | 7/1999 | Miller et al. | |
| 5,930,765 A * | 7/1999 | Martin | 705/14.12 |
| 5,974,018 A | 10/1999 | Takenaka | |
| 6,018,765 A | 1/2000 | Durana et al. | |
| 6,022,223 A | 2/2000 | Taniguchi et al. | |
| 6,057,874 A | 5/2000 | Michaud | |
| 6,066,792 A | 5/2000 | Sone | |
| 6,088,455 A * | 7/2000 | Logan et al. | 380/200 |
| 6,104,334 A | 8/2000 | Allport | |
| 6,166,735 A * | 12/2000 | Dom et al. | 715/749 |
| 6,172,948 B1 | 1/2001 | Keller et al. | |
| 6,173,422 B1 | 1/2001 | Kimura et al. | |
| 6,182,126 B1 * | 1/2001 | Nathan et al. | 725/134 |
| 6,191,904 B1 | 2/2001 | Nguyen et al. | |
| 6,223,990 B1 | 5/2001 | Kamei | |
| 6,232,539 B1 | 5/2001 | Looney et al. | |
| 6,317,784 B1 * | 11/2001 | Mackintosh et al. | 709/219 |
| 6,344,878 B1 | 2/2002 | Emura | |
| 6,380,984 B1 | 4/2002 | Inoue et al. | |
| 6,418,421 B1 | 7/2002 | Hurtado et al. | |
| 6,453,111 B1 * | 9/2002 | Sklar et al. | 386/281 |
| 6,578,200 B1 * | 6/2003 | Takao et al. | 725/54 |
| 6,587,404 B1 * | 7/2003 | Keller et al. | 369/30.06 |
| 6,668,158 B1 | 12/2003 | Tsutsui et al. | |
| 6,732,369 B1 * | 5/2004 | Leftwich et al. | 725/39 |
| 6,792,007 B1 * | 9/2004 | Hamada et al. | 370/542 |
| 7,076,205 B2 | 7/2006 | Tsutsui et al. | |
| 7,263,329 B2 | 8/2007 | Acker | |
| 7,310,629 B1 | 12/2007 | Mendelson et al. | |
| 2001/0022127 A1 | 9/2001 | Chiurazzi et al. | |
| 2005/0166956 A1 * | 8/2005 | Aisenbrey | 136/259 |
| 2006/0117370 A1 | 6/2006 | Kitazato et al. | |
| 2006/0217060 A1 | 9/2006 | Tsutsui et al. | |
| 2006/0282544 A1 * | 12/2006 | Monteiro et al. | 709/231 |
| 2007/0088804 A1 | 4/2007 | Qureshey et al. | |
| 2007/0112449 A1 * | 5/2007 | Moon et al. | 700/94 |

FOREIGN PATENT DOCUMENTS

| | | |
|---|---|---|
| JP | 5-325412 | 12/1993 |
| JP | 6-202968 | 7/1994 |
| JP | 7-177121 | 7/1995 |
| JP | 7-296508 | 11/1995 |
| JP | 8-46948 | 2/1996 |
| JP | 8-65621 | 3/1996 |
| JP | 8-101694 | 4/1996 |
| JP | 8-279982 | 10/1996 |
| JP | 8-306167 | 11/1996 |
| JP | 8-306168 | 11/1996 |
| JP | 9-9198 | 1/1997 |
| JP | 9-81169 | 3/1997 |
| JP | 9-214882 | 8/1997 |
| JP | 10-4544 | 1/1998 |
| JP | 10-49184 | 2/1998 |
| JP | 10-108148 | 4/1998 |
| JP | 10-164534 | 6/1998 |
| JP | 10-262231 | 9/1998 |
| JP | 11-184467 | 7/1999 |
| JP | 2000-32414 | 1/2000 |
| JP | 2000-76542 | 3/2000 |
| WO | WO 96/34466 | 10/1996 |
| WO | WO 96/41472 A1 | 12/1996 |
| WO | WO 97/41560 A1 | 11/1997 |
| WO | WO 99/25082 | 5/1999 |

OTHER PUBLICATIONS

U.S. Appl. No. 12/833,770, filed Jul. 9, 2010, Tsutsui, et al.

Office Action issued Jan. 18, 2011 in Japanese Patent Application No. 2008-188630.

* cited by examiner

CONTROL METHOD, CONTROL APPARATUS, DATA RECEIVING AND RECORDING METHOD, DATA RECEIVER AND RECEIVING METHOD

CROSS-REFERENCE TO RELATED APPLICATIONS

This application is a continuation of U.S. application Ser. No. 11/396,438 filed Apr. 3, 2006, which is a divisional of U.S. application Ser. No. 10/694,458 filed Oct. 27, 2003, now U.S. Pat. No. 7,076,205, which is a divisional of U.S. application Ser. No. 09/354,612 filed Jul. 15, 1999, now U.S. Pat. No. 6,668,158, the entire contents of which are hereby incorporated by reference, and claims priority under 35 U.S.C. 119 to Japanese Application Nos. P10-202360 filed Jul. 16, 1998, P10-202361 filed Jul. 16, 1998, and P10-202362 filed Jul. 16, 1998.

BACKGROUND OF THE INVENTION

The present invention relates to a control method and control apparatus suited for downloading, for example, music data or the like, transmitted via a digital satellite broadcast to a data storage apparatus.

Digital satellite broadcasting is now spreading. Compared with existing analog broadcasting, the digital satellite broadcasting resists noise and fading and allows transmission of high quality signals. Also, the digital satellite broadcasting improves frequency utilizing efficiency and provides multi channels. For instance, in the digital satellite broadcasting, it is possible for one satellite to provide several hundreds of channels. The digital satellite broadcasting provides many specialized channels such as sports, movie, music and news, on which channels individual contents are broadcast.

Among these specialized channels, music channels are among the most popular broadcasting programs for promotion purposes in which mainly new songs and hit songs are put on the air.

As stated above, programs for introducing new songs and hit songs are put on the air by means of moving pictures and sound via conventional music channels. If viewers watch the music channels and find some songs favorable, they want to buy CDs or the like containing the songs and enjoy them. Also, they are sometimes inclined to gather information on the artists singing the songs they like and information on albums containing the favorite songs. When a viewer watches a music program and wants to know about information on an artist or his or her album containing the viewer's favorite song, it is convenient that the viewer can obtain the information instantly. Further, when the viewer finds a favorite song, it is convenient that he or she can download audio data on the song. The conventional music channels are, however, one-way media to send moving pictures and sound and are not able to respond to such requests from viewers.

To solve the above disadvantage, there has been proposed a music content transmission system which allow viewers to easily obtain information on music put on the air on a music channel and to easily download music data to a data storage device (as described in, for example, PCT/JP98/05044 filed on Nov. 10, 1998 by the same applicant as that of this application). There has also been proposed downloading information on lyrics and jacket data as well as the music data in the music content transmission system.

Meanwhile, to provide such a music content transmission system, a user side for receiving digital satellite broadcasting needs to connect a tuner for receiving the digital satellite broadcasting needs to a data storage device (recording device) which employs a storage medium such as a magneto-optical disc and needs to download music data received at the tuner to the recording device. In this case, if the music data received at the tuner is to be downloaded to the recording device, processing is needed for controlling the recording operation and the like of the recording device based on data including the broadcast start and end time of the song as well as music data received at the tuner. Thus, it is required to set the tuner and the recording device to operate in cooperation with each other. For instance, there are various types of recording devices for recording audio signals. It is difficult for data from broadcasting stations from which music programs are transmitted to directly control unspecified recording devices connected to tuners.

Furthermore, the number of recording devices connected to a tuner is not always one and a plurality of recording devices may be connected to the tuner. In that case, it is also impossible for the broadcasting stations to select the recording device to which music data is downloaded. It is, therefore, necessary to deal with them at the tuner side in some way.

It is noted that the above description concerns a case of transmitting music data by digital satellite broadcasting. The same problems occur when various content data transmitted are from the external side using broadcast waves or the like and are to be downloaded to the reception side based on the data transmitted therefrom together with the content data.

SUMMARY OF THE INVENTION

It is an object of the present invention to easily download content data obtained from the external side to connection equipment.

The music data transmitted from the transmitting side by such a transmission system is usually copyrighted data. Therefore, if the music data downloaded to the user side recording apparatus is reproduced without restrictions, it is difficult to protect copyrights and the music content transmission system itself might not be effectively utilized.

In addition, separate copyrights are given to the authors of the character data on lyrics and the static image data on images of the jacket attached to the music data, respectively. It is, therefore, necessary to deal with those copyrights differently from the copyright of the music data.

It is another object of the present invention to make it possible to appropriately deal with the recording of the transmitted data having copyrights.

When dealing with the reception of songs broadcast using such a transmission system and downloading them to a user side recording apparatus, it is possible to download a song that the user likes to the recording apparatus just before the end of the broadcast time. This is accomplished by determining the time at which the song that the user wants to record is broadcast (transmitted) by a certain method and downloading the song that the user desires to the recording apparatus. Since many music data (songs) can be transmitted with such a system, it takes a lot of time and labor to look for songs which the user desires to download when a list of broadcast times of respective songs is simply displayed on a program guide screen.

It is yet another object of the present invention to make it possible to easily deal with the processing required for obtaining desired data when much data, such as music data, is transmitted by broadcasting.

According to the present invention a method for controlling a second equipment connected to a first equipment by executing a first program inputted to the first equipment from an external side and a second program prepared for the first equipment in advance, comprises the steps of conducting processing for starting the second program; and acquiring information on the second equipment by execution of the started second program.

According to the control method of the present invention, the acquisition of information on the second equipment by the first program inputted from the external side to the first equipment is executed by the second program prepared in the first equipment.

In addition, a control apparatus according to the present invention comprises a first storage unit operable to store a first program inputted from an external side; a second storage unit prepared in advance and operable to store a second program started by the first program; and a processing unit for executing the programs stored in the first and second storage units, the processing unit being operable to acquire information on a connected equipment based on execution of the second program stored in the second storage unit and to control the connected equipment based on the acquired information.

According to the control apparatus of the present invention, the control of the equipment connected based on the first program inputted from the external side is executed through the second program contained in this apparatus.

A data receiving and recording method according to the present invention comprises the steps of receiving data coded by a predetermined method and copyright information attached to the data; and, while recording the received data on a predetermined recording medium, causing the copyright information to be recorded in a predetermined area of the recording medium.

According to the data receiving and recording method of the present invention, the copyright information as well as the data is recorded on the recording medium.

Further, a data receiver according to the present invention comprises receiving means for receiving data of multiplexed and transmitted copyright information; determining means for determining the copyright information received by the receiving means; and transmitting means for transmitting the data received by the receiving means to a predetermined recording apparatus and transmitting the copyright information determined by the determining means to the recording apparatus as information attached to the data.

According to the data receiver of the present invention, the copyright information as well as the data is transmitted to the recording apparatus to thereby make it possible to record the copyright information as well as the data on the recording apparatus.

A receiving method according to the present invention comprises the steps of receiving text data strings indicating names relevant to main data transmitted by a broadcast on a predetermined channel; retrieving text strings including a designated character string from the received text data strings; displaying a list of the designated character strings; receiving the main data relevant to a selected character string from the displayed character strings; and downloading the received main data to a predetermined recording apparatus.

According to the receiving method of the present invention, it is possible to retrieve necessary data based on the received text data string and to download the retrieved data.

Furthermore, a data receiver according to the present invention comprises receiving means for receiving main data transmitted by broadcast of a predetermined channel and text data indicating names relevant to the main data; input means for inputting character strings to be retrieved; retrieval means for retrieving character strings inputted by the input means from a text data string received by the receiving means; display control means for creating image data for displaying text including the character strings retrieved by the retrieval means; and control means for receiving main data designated by a text selected from a table list displayed by the image data in the receiving means and downloading the main data to a predetermined recording apparatus.

According to the data receiver of the present invention, the retrieval means can retrieve necessary data based on the text data string received by the receiving means and control means can download the retrieved data.

DETAILED DESCRIPTION OF THE PREFERRED EMBODIMENT

Now, one embodiment of the present invention will be described with reference to the accompanied drawings.

A system to which the present invention may be applied may be designed to broadcast a music program using digital satellite broadcasting technology and to transmit music data relevant to the music program, whereby a viewer can watch and listen to the music program and, if the viewer finds a certain song interesting, the viewer can easily buy the song on the spot.

Figure 1:
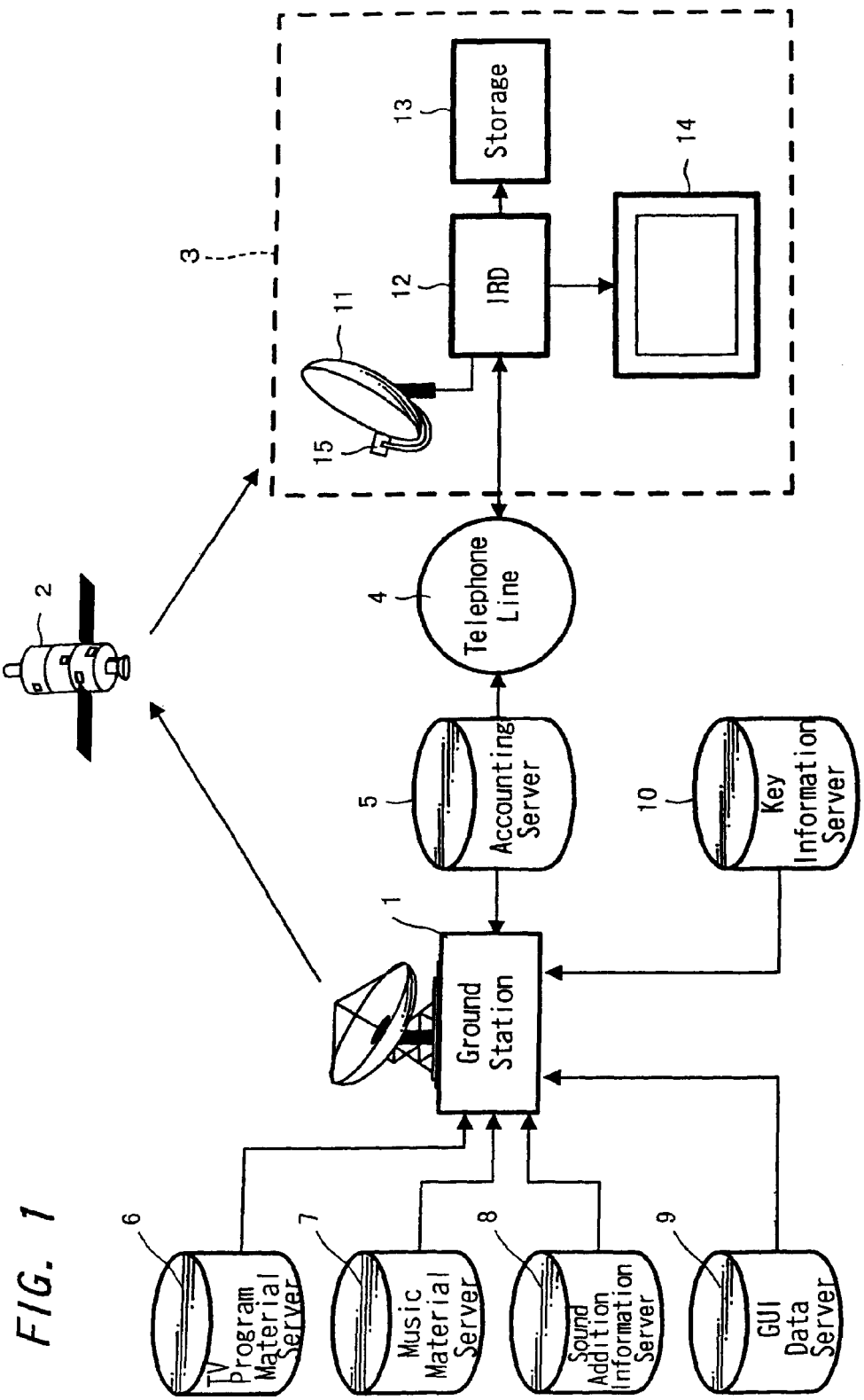
FIG. 1 is a block diagram showing an exemplified constitution of an overall system in accordance with an embodiment of the present invention.

FIG. 1 shows the overall constitution of a music content transmission system to which the present invention may be applied. As shown therein, material for TV program broadcasting from a TV program material server 6, material for music data from a music material server 7, sound addition information from an sound addition information server 8 and GUI (Graphical User Interface) data from a GUI data server 9 are transmitted to a ground station 1 of digital satellite broadcasting system.

The TV program server 6 provides material for ordinary music broadcast programs. The music broadcast program transmitted from the TV program material server 6 contains moving pictures and sound. In the ordinary music broadcast program, moving pictures and sound for, for example, the promotion of new songs, are broadcast or the countdown of latest hit songs is broadcast.

The music material server 7 provides audio programs using audio channels. The material for the audio programs is only sound. The music material server 7 transmits material for audio programs of a plurality of audio channels to the ground station 1. In the music broadcast programs on the respective audio channels, the same songs are broadcast repeatedly on predetermined unit time intervals. Each of the audio channels is independent and is used in various manners. For instance, recommended songs among the latest Japanese popular songs may be broadcast repeatedly for a predetermined time on a certain audio channel, those among the latest American popular songs may be broadcast repeatedly for a predetermined time on another audio channel, and those among the jazz songs may be broadcast repeatedly for a predetermined time on yet another audio channel. Alternatively, a plurality of songs of a certain artist may be divided among the respective audio channels and broadcast thereon repeatedly.

The sound addition information server 8 provides time information on songs outputted from the music material server 7. The server 8 also provides copyright information on each songs, i.e., information on digital copy restrictions.

The GUI data server 9 provides data for creating a screen of a list page of transmitted songs and an information page of the respective songs, data for creating static image data on jackets, data for creating an EPC (Electronic Program Guide) screen and the like. As will be described in detail later, the system to which the present invention may be applied displays lyrics of the transmitted songs and concert information of artists by the operation of GUI on the screen. The system also can select and download songs and can make reservations for the selection and downloading of songs by operating the GUI on the screen. The GUI data server 9 transmits data therefor. It is noted that the GUI data in this embodiment are data in a format determined by, for example, MHEG (Multimedia and Hypermedia Information Coding Experts Group) method. The static image data on jackets and text data on lyrics are set to be transmitted while allotted copyright information to every data, i.e., information on digital copy restrictions.

The ground station 1 multiplexes and transmits video data and audio data serving as material for music program from the TV program material server 6, audio data serving as material for audio channels from the music material server 7, sound addition information from the sound addition information server and GUI data from the GUI data server 9. At this time, video data on the TV program broadcasting is compressed by, for example, a MPEG (Moving Picture Experts Group) 2 method. The audio data on the TV program broadcasting is compressed by the MPEG audio method. The audio data on respective audio channels are compressed by two different methods, e.g., the MPEG audio method and the ATRAC (Adaptive Transform Acoustic Coding) method. These items of data are encoded using key information from a key information server 10 during multiplexing.

Signals from the ground station 1 are received by receiving equipment 3 installed in each household through an artificial satellite 2. A plurality of transponders are installed in the satellite 2. A transponder has, for example, 30 Mbps transmission capability. A parabola antenna 11, an IRD (Integrated Receiver Decoder) 12, a storage device 13 and a television set 14 are located at each household.

The signals transmitted through the satellite 2 are received by the parabola antenna 11. The received signals are converted to signals at a predetermined frequency by an LNB (Low Noise Block Downconverter) 15 attached to the parabola antenna 11 and supplied to the IRD 12.

The IRD 12 selects a signal on a predetermined channel from the received signals and demodulates video data and audio data. The IRD 12 also creates a list page of transmitted songs, an information page of the respective songs and an EPG screen. The output of the IRD 12 is supplied to the television set 14.

The storage device 13 is provided to hold the downloaded audio data. For instance, an MD recorder/player using a magnet-optical disk referred to as MD as a storage medium, a DAT recorder/player using a magnetic tape, as a recording medium, a DVD recorder/player using, as a recording medium, an optical disk for video recording can serve as the storage device 13. It is also possible to use a personal computer as the storage device 13 and store audio data on a hard disk or a CD-ROM of the computer.

The IRD 12 is coupled to an accounting server 5 through, for example, a telephone line 4. An IC card storing various information is inserted into the IRD 12. When the audio data on songs is downloaded, the information is recorded on the IC card. The information on the IC card is fed to the accounting server 5. The accounting server 5 prepares appropriate accounting from the downloaded information and charges a viewer a fee. In this way, by appropriate accounting, it is possible to protect a copyright of a downloaded song.

As described above, in the system in this embodiment, the ground station 1 multiplexes and transmits video data and audio data serving as material for music program broadcasting from the TV program material server 6, audio data serving as material for audio channels from the music material server 7, sound addition information from the sound addition information server 8 and GUI data from the GUI data server 9. If the broadcasting data is received at the receiving equipment 3 in each household, a viewer can watch a music program and the GUI screen is displayed based on the transmitted GUI data. When one or more necessary operations are performed while looking at the GUI screen, the viewer can look at the information page of the respective songs and try listening to the respective songs. Further, by conducting one or more other necessary operations while looking at the GUI screen, it is possible to download audio data on a desired song and store it in the storage disk 13.

Next, the viewer's operation of the receiving equipment 3 installed at each household will be described in more detail.

Figure 2:
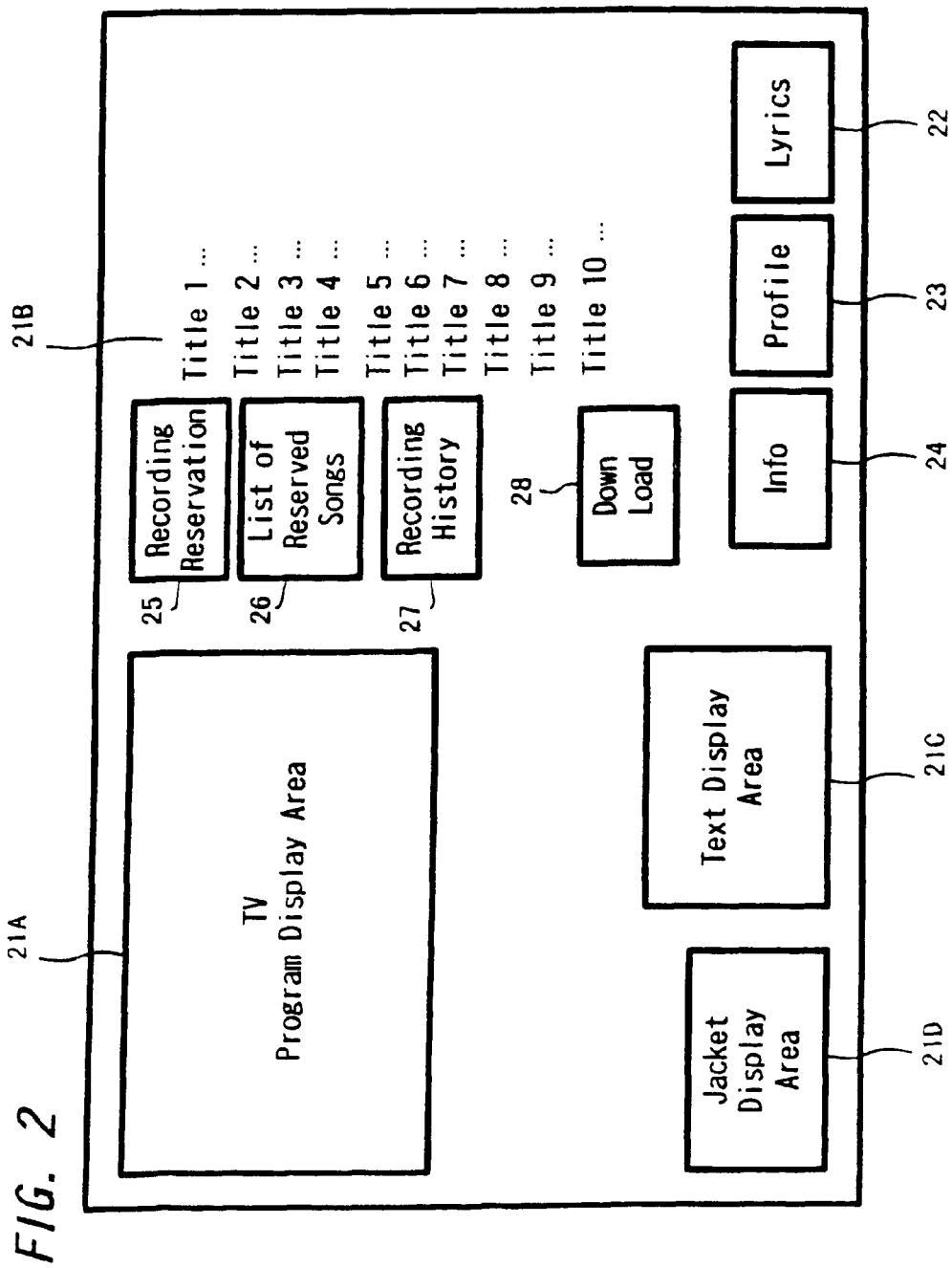
FIG. 2 is an explanatory view showing an exemplified reception screen in accordance with an embodiment of the present invention.

If a broadcast wave is received at the receiving equipment 3 in each household, a screen shown in FIG. 2 appears on the television set 14. A moving picture based on the music programs supplied from the TV program material server 6 is displayed in a TV program display area 21A at the top left-hand corner of the screen. A music list 21B broadcast on respective audio channels are displayed at the top right-hand corner of the screen. A text display area 21C and a jacket display area 21D are set at the bottom left-hand corner of the screen. A lyric display button 22, a profile display button 23, an information display button 24, a recording reservation button 25, a reserved song list display button 26, a record history display button 27 and a download button 28 are displayed on the right of the screen.

The viewer looks for an interesting song while looking at the names of songs displayed on the list 21B. If the viewer finds a certain song interesting, he or she operates an arrow key on a remote commander and puts a cursor on the name of the song and depresses an enter key on the remote commander attached to the IRD 12. Thus, the viewer can listen to the music associated with the name on which the cursor is put. That is, since the same song is repeatedly broadcast for a predetermined unit time on each channel, it is possible to switch over to an audio channel on which the song is broadcast while the TV program display area 21A on the scene is not changed, thereby making it possible for the viewer to try listening to the song. At this moment, the static image of the album jacket containing the song is displayed in the jacket display area 21D.

In this state, the cursor is put on the lyric display button 22 and the enter key is depressed (which operations of putting the cursor on a button and depressing the enter key will be referred to as 'depress a button' hereinafter). Then, the lyrics of the song are displayed in the text display area 21C in synchronism with the audio data. Likewise, if the profile display button 23 or information display button 24 is depressed, the profile of an artist corresponding to the song, concert information, or the like is displayed in the test display area 21C. In this way, the user can see what types of songs are broadcast at present as well as detailed information on the respective songs.

If the user wants to buy the song that he or she has just sampled, the download button 28 is depressed. When the download button 28 is depressed, audio data on the selected song is downloaded and stored in the storage device 13. In addition to the audio data on the song, the data on the lyrics of the song, information on the profile of the artist, data on static image of the jacket and the like can be downloaded. Every time a song is downloaded, information on the song is stored in the IC card provided in the IRD 12. The information stored in the IC card is taken out by the accounting server 5, for example, once per month, thereby making it possible to protect the copyright of the downloaded song.

If the viewer wants to make a download reservation, he or she depresses the recording reservation button 25. If the button 25 is depressed, the GUI screen is switched to display a list of songs which can be reserved on the entire screen. It is possible to display a list of songs retrieved for every hour, every week or every genre. If the viewer selects a song for which a download reservation is to be made, from among the songs of the list, information on the selected song is registered in the IRD 12. Then, if the viewer intends to confirm the song for which the download reservation has been made, a reserved song list display button 26 is depressed and the list can be displayed on the entire screen. The song thus reserved is downloaded at a reservation time by the IRD 12 and stored in the storage device 13.

If the viewer intends to confirm the song downloaded, a recording history button 27 is depressed and then a list of the songs which have been already downloaded is displayed on the entire screen.

As can be seen from the above, in the receiving equipment 3 of the system in this embodiment, a list of songs is displayed on the GUI screen of the television set 14. If a song is selected in accordance with the display on the GUI screen, the viewer can try listening to the song and review the lyrics, profile of the artist, and the like. Furthermore, it is possible to download a song, make a reservation for downloading the song, display a download history and a list of reserved songs or the like.

As described above, in the music content transmission system to which the present invention may be applied, not only music broadcast programs are transmitted but also audio data on music are transmitted using a plurality of audio channels. Then, by searching a desired song using, for example, a list of songs broadcast, it is possible to easily store the music data in the storage device 13. Now, this system will be described in more detail hereinafter.

Figure 3:
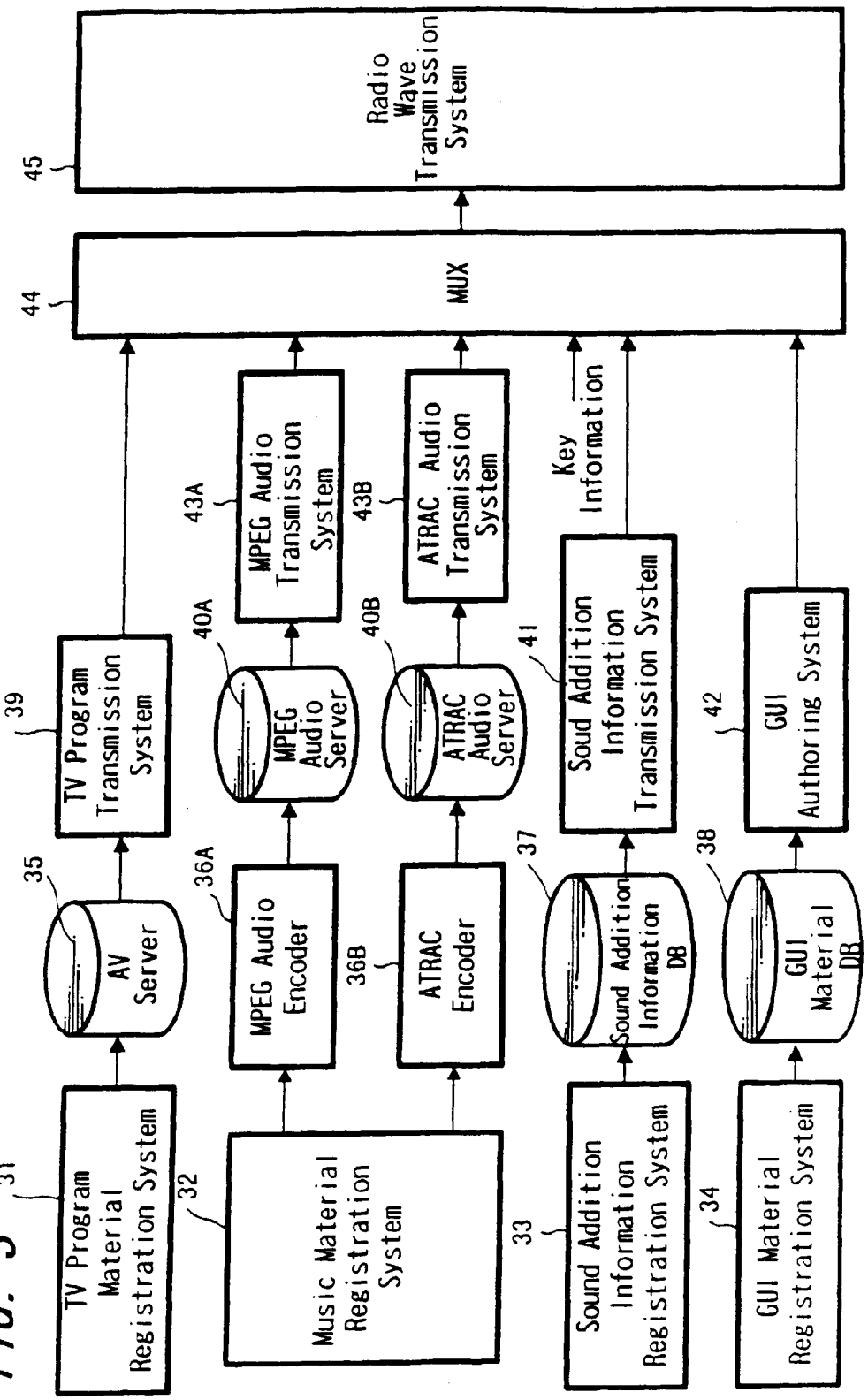
FIG. 3 is a block diagram showing an exemplified constitution of a data transmission side in accordance with an embodiment of the present invention.

FIG. 3 shows the constitution of the ground station 1 in the music content transmission system in this embodiment.

In FIG. 3, the material data from a TV program material registration system 31 is registered in an AV server 35. The material data includes video data and audio data. The data registered in the AV server 35 is transmitted to a TV program transmission system 39 where the video data is compressed by, for example, an MPEG2 method and the audio data is compressed by, for example, an MPEG audio method and packeted. The output of the TV program transmission system 39 is fed to a multiplexer 44.

The audio data from a music material registration system 32 is supplied to an MPEG2 audio encoder 36A and an ATRAC encoder 36B, respectively, where the data is encoded and then registered in an MPEG audio server 40A and an ATRAC audio server 40B, respectively. The MPEG audio data registered in the MPEG audio server 40A is fed to an MPEG audio transmission system 43A where the data is packeted and fed to the multiplexer 44. The ATRAC data registered in the ATRAC audio server 40B is fed to an ATRAC audio transmission system 43B as four-fold speed ATRAC data, in which ATRAC audio transmission system 43B the data is packeted and fed to the multiplexer 44.

Moreover, the sound addition information from a sound addition information registration system 33 is registered in a sound addition information database 37. The sound addition information registered in the sound addition information database 37 is fed to a sound addition information system 41, where the information is packeted and then fed to the multiplexer 44.

Additionally, the GUI data from a GUI material registration system 34 is registered in a GUI material database 38. The GUI material data registered in the GUI material database 38 is fed to a GUI authoring system 42, where data on a GUI screen is processed, packeted and then fed to the multiplexer 44. It is noted that the GUI material data involves static image information on a jacket, information on the lyrics of a song, information on concerts of an artist and the like. The static image information is, for example, information compressed by the JPEG (Joint Photographic Experts Group) method into 640×480 pixels and the lyric information is, for example, text data of 800 characters or less. Both the static image information and the lyric information are packeted.

In the multiplexer 44, the video packet and audio packet from the TV program transmission system 39, the audio packet from the MPEG audio transmission system 43A, the four-fold speed audio packet from the ATRAC audio transmission system 43B, the sound addition information packet from the sound addition information system 41 and the GUI data packet from the GUI authoring system 42 are time-base multiplexed and encoded using key information from the key information server 10 (FIG. 1).

The output of the multiplexer 44 is fed to a radio wave transmission system 45, where the data are subjected to error code addition, modulation, frequency conversion processing and transmitted from the antenna toward the satellite 2.

Figure 4:
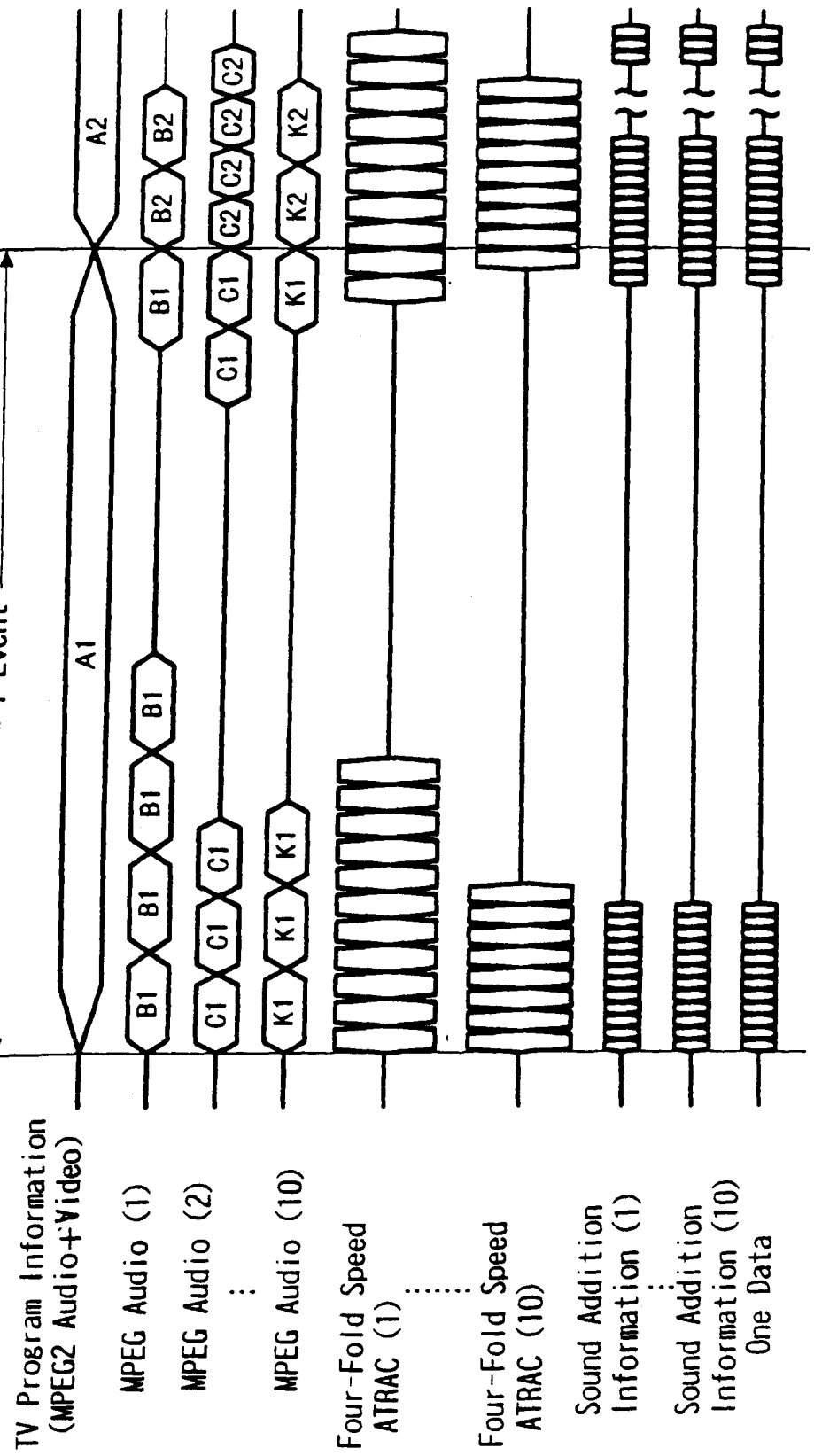
FIG. 4 is an explanatory view showing exemplified transmission data in accordance with an embodiment of the present invention.

FIG. 4 shows an example of data transmitted from the ground station 1. It is noted that each item of the data is actually time-base multiplexed. As shown in FIG. 4, it is assumed that one event is from time t1 to time t2 and the next event starts at time t2. An event is a unit in which the lineup of songs is changed, and the unit of one event is normally 30 minutes to one hour. For instance, the 20th to 11th songs among the top 20 of the latest hit songs are broadcast in an earlier event and the 10th to first songs may be broadcast in a later event.

As shown in FIG. 4, in the event from time t1 to time t2, an ordinary moving picture program is broadcast, i.e., a music program having a predetermined content A1 is broadcast. Moving pictures and sound are broadcast on this ordinary music program.

Ten channels of CH1 to CH10, for example, are prepared as audio channels. Here, the same song is repeatedly transmitted in one event through each of the audio channels CH1, CH2, CH3, . . . CH10. That is to say, in the event from time t1 to time t2, a song B1 is repeatedly transmitted through the audio channel CH1 and a song C1 is repeatedly transmitted through the audio channel CH2. Likewise, a song K1 is repeatedly transmitted through the audio channel CH10. In the event starting at time t2, a song B2 is repeatedly transmitted through the audio channel CH1 and a song C2 is repeatedly transmitted through the audio channel CH2. Likewise, a song K2 is repeatedly transmitted through the audio channel CH10. The same thing is common to MPEG audio channels and four-fold speed ATRAC audio channels.

Figure 5:
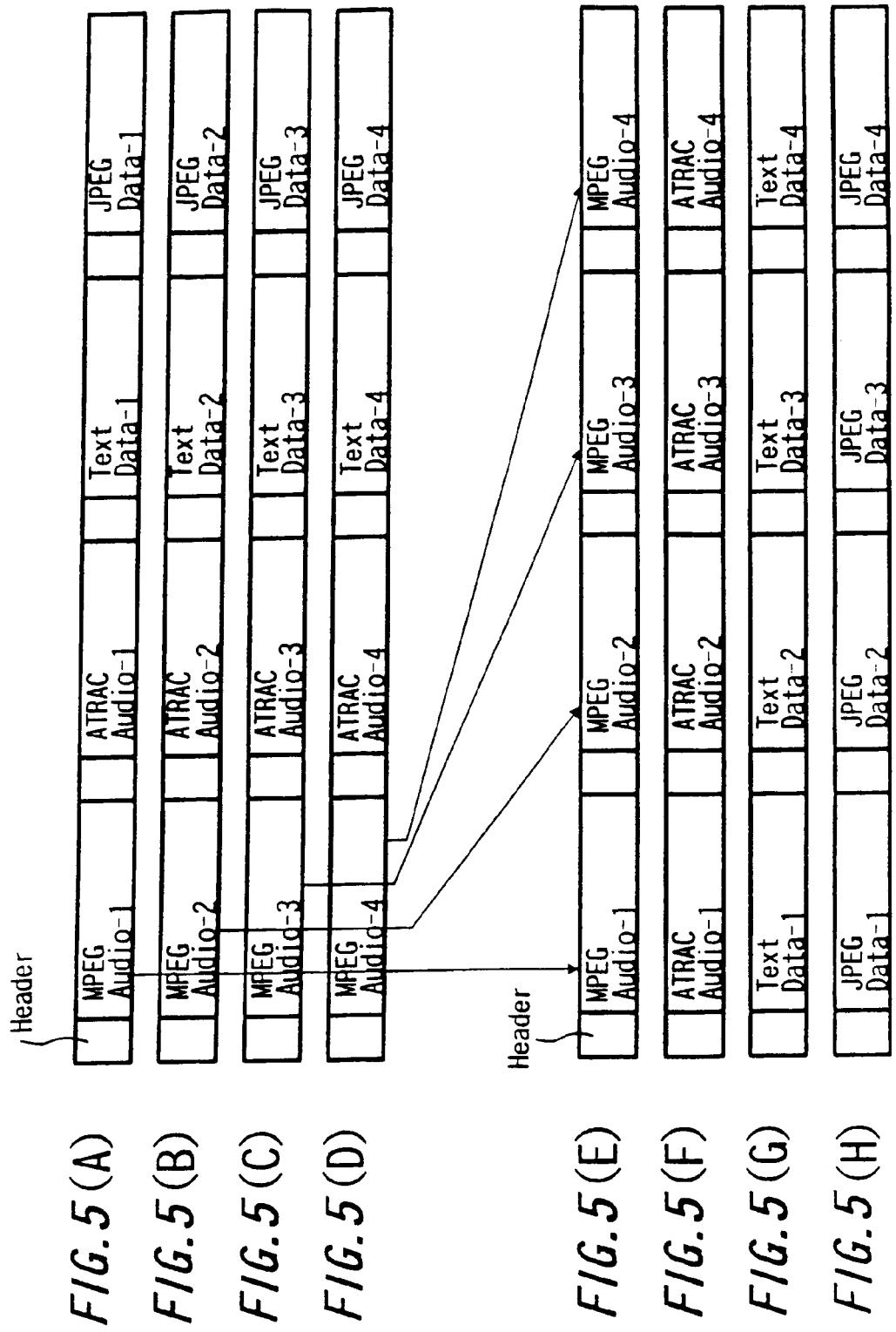
FIG. 5 is an explanatory view showing exemplified transmission state in accordance with an embodiment of the present invention.

In FIG. 4, the MPEG audio channel and the four-fold speed ATRAC audio channel having the same number in parenthesis relate to the same song. In addition, a sound addition information channel having a number in parenthesis is added to audio data of an audio channel having the same number. Further, static image data and text data transmitted as GUI data are created for every channel. These items of data are time-base multiplexed in a MPEG 2 transport packets shown in FIGS. 5(*a*) to 5(*d*) and then transmitted. They are reconstructed using header information of the respective data packets in the IRD 12 as shown in FIGS. 5(*e*) to 5(*h*).

Figure 6:
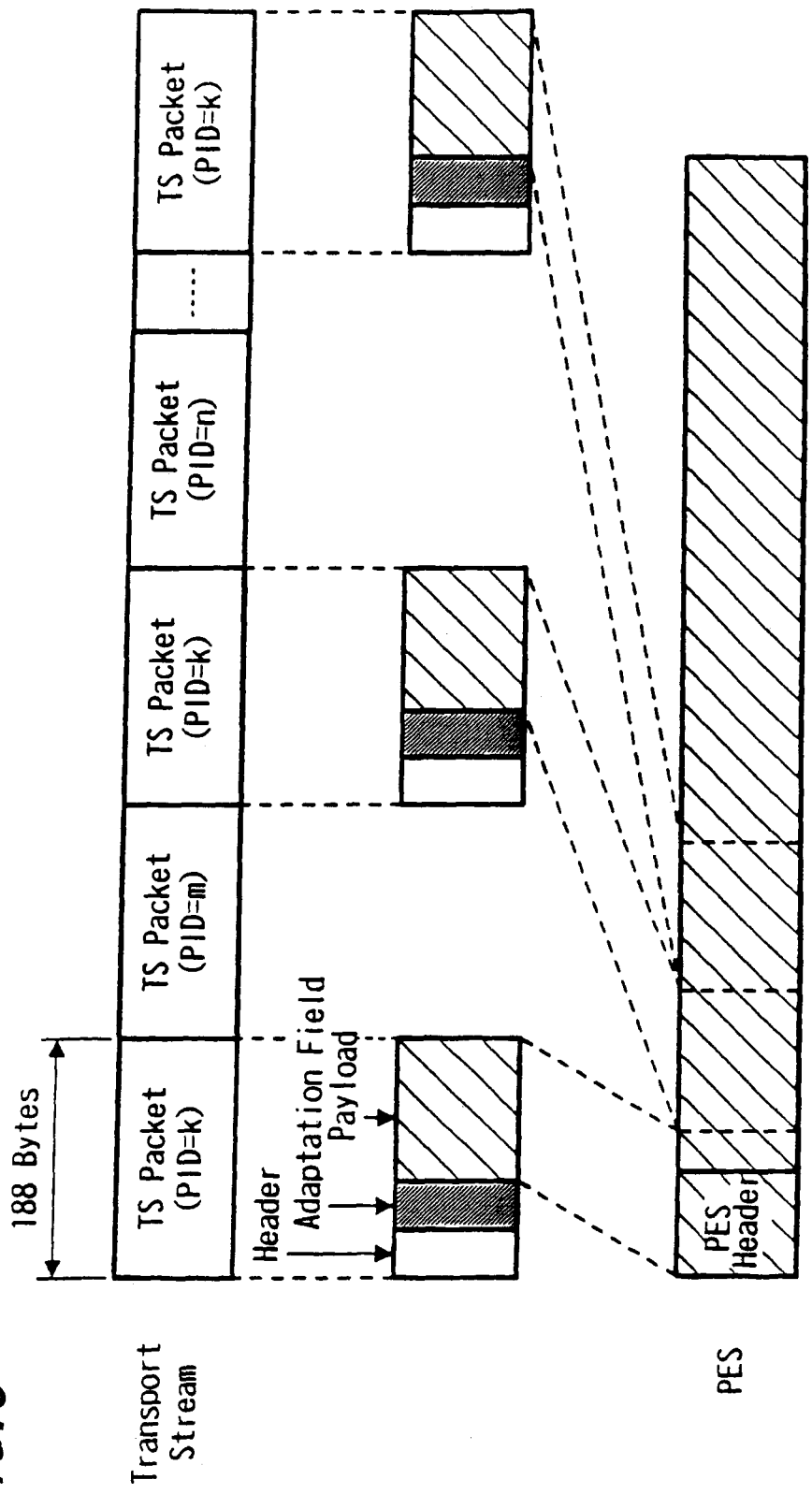
FIG. 6 is an explanatory view showing an exemplified packet structure in accordance with an embodiment of the present invention.

Now, the conceptual view of a transport stream to be transmitted is shown in FIG. 6. As shown therein, a transport stream is a group of transport packets (TS packets) of fixed length of 188 bytes. The TS packet consists of a header, an adaptation field and a payload. Data such as audio data, static image data and sound addition information are stored in the payload. A packet ID (to be referred to as 'PID' hereinafter) for separating streams and sections is stored in the header.

Figure 7:
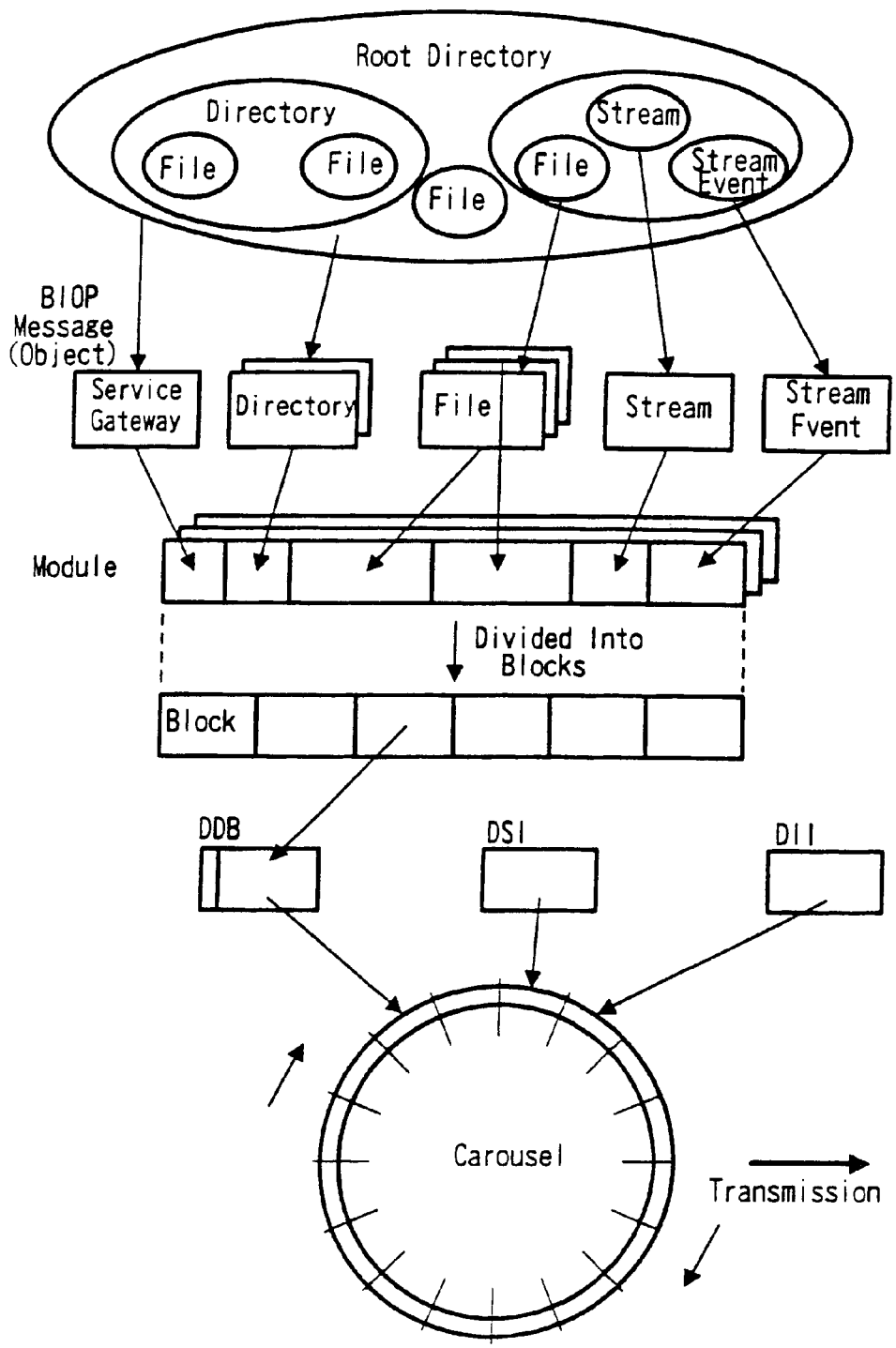
FIG. 7 is an explanatory view showing the concept of MHEG data transmission in accordance with an embodiment of the present invention.

The data such as static image, moving image, sound and text constituting GUI data and script data described to conduct predetermined processes in response to the operation of a user on the GUI are described in a content description format referred to as MHEG-5 and transmitted in a protocol referred to as DSM-CC (Digital Storage Media-Command and Control). FIG. 7 is a conceptual transmission of MHEG data in this embodiment. Data broadcasting services are all included in a root directory referred to as a service gateway. Types of the objects included in the service gateway are a directory, a file, a stream, a stream event and the like. Files in the service gateway are data files such as static image data files and text data files. The stream therein contains information linked to data streams of other data services and those of audio and video data streams. The stream event contains link information and time information. Directories are folders for combining interrelated data. The data consists of a group of modules and is transmitted.

A module is divided into blocks for every predetermined unit. Each block is allotted a header and converted into a format referred to as DBB (Download Data Block). On the other hand, a control message referred to as DII (Download Inform Indication) containing information on the size of a module required for receiving the module at the receiver side and a control message referred to as DII (Download Server Initiate) containing information which indicates the address of a root directory of a data service at the receiver side are created. The three types of messages, i.e., DBB, DSI and DSI are periodically and repeatedly outputted and transmitted in an annular structure referred to as a carousel so that the reception side can receive it at any time.

Next, the receiving equipment 3 in each household will be described.

Figure 8:
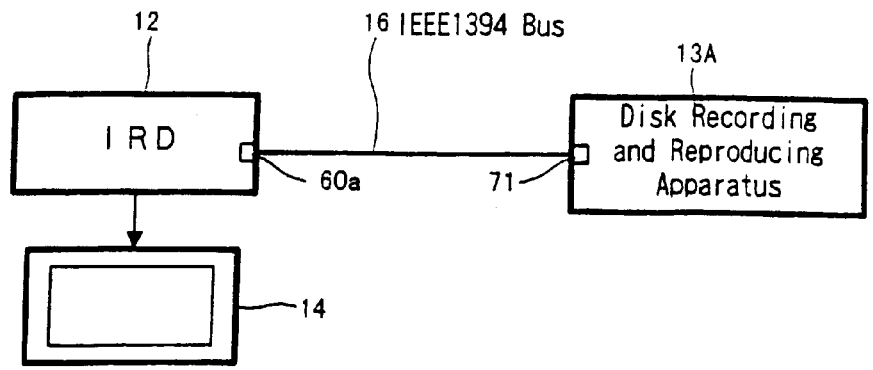
FIG. 8 is a block diagram showing an exemplified connection in accordance with an embodiment of the present invention.

As shown in FIG. 1, the receiving equipment 3 in each household includes the parabola antenna 11, the IRD 12, the storage device 13 and the television set 14. As shown in FIG. 8, a recording and reproducing apparatus 13A in which a magnet-optical disk referred to as MD (mini-disk) is used as a recording medium, serves as a storage device. The recording and reproducing apparatus 13A in this embodiment is a video recorder corresponding to the connection of the bus line 16 of the IEEE1394 type. A description will now be given to a case where the IRD 12 and the recording and reproducing apparatus 13A are connected by the IEEE1394 bus line 16. The recording and reproducing apparatus 13A in compliance with IEEE1394 can store audio data on songs selected in the IRD 12, jacket data on the songs and text data including lyric data. It is to be noted that a plurality of (e.g., up to 64) equipment can be linked by the so-called link connection and a plurality of storage devices can be also connected to the IRD 12 by the IEEE1394 bus line 16.

Figure 9:
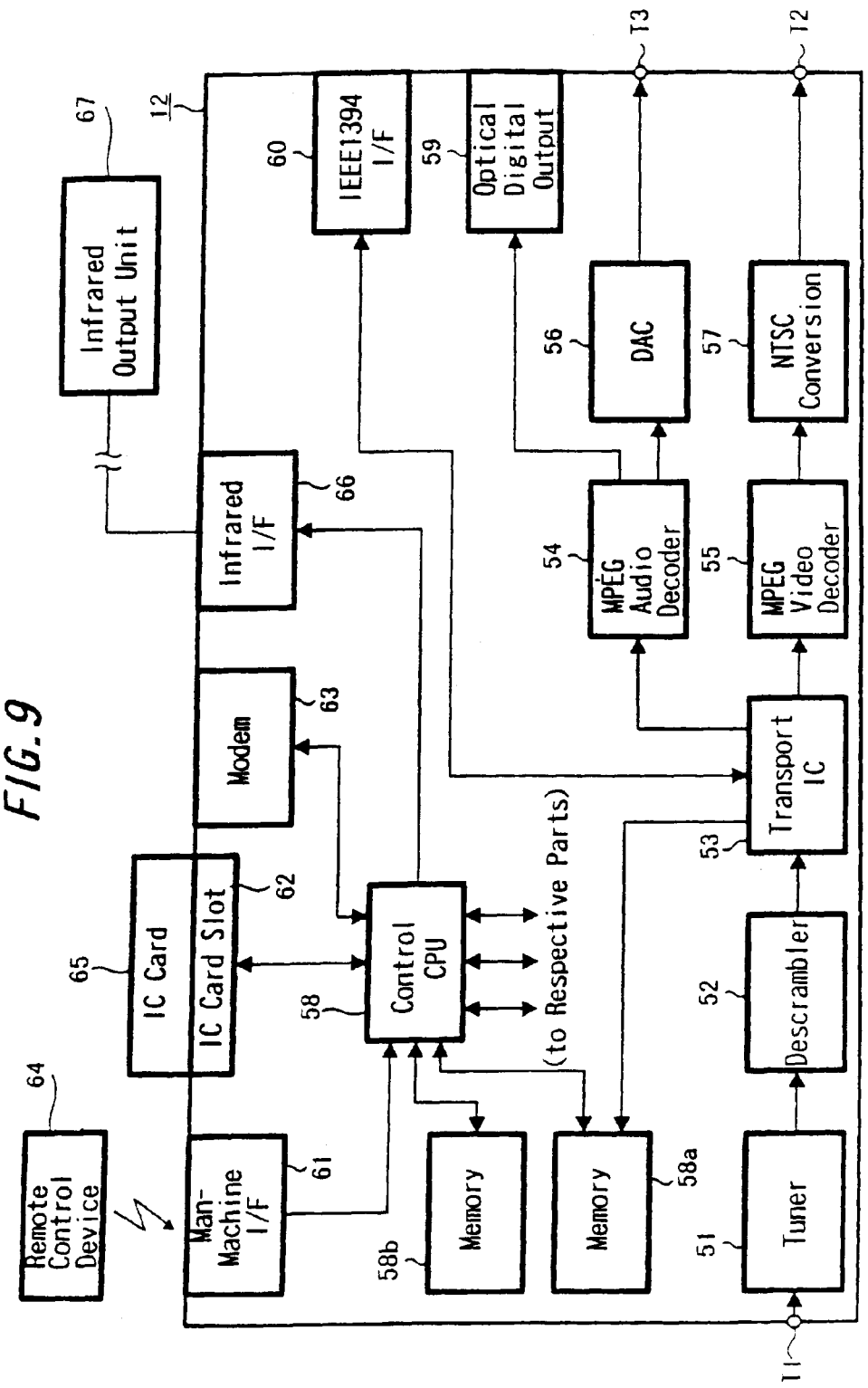
FIG. 9 is a block diagram showing an exemplified IRD constitution in accordance with an embodiment of the present invention.

FIG. 9 shows an example of the constitution of the IRD 12. The IRD 12 is provided with an input terminal T1, an analog video output terminal T2, an analog audio output terminal T3, an optical digital output interface 59, an IEEE1394 interface 60, a man-machine interface 61, an IC card slot 62, a modem 63, an infrared interface 66 as external terminals or interfaces.

The input terminal T1 is a terminal to which a reception signal converted into a signal at a predetermined frequency is inputted at LNB 25. The analog video output terminal T2 is a terminal for supplying an analog video signal to the television set 14. The analog audio output terminal T3 is a terminal for supplying an analog audio signal to the television set 14. The analog audio output terminal T4 is a terminal for supplying an analog audio signal to the analog input of the storage device. The optical digital output interface 59 which complies with IEC958, transmits PCM audio data to an optical fiber cable (not shown). The IEEE1394 interface 60 transmits video data, audio data, various commands and the like to the IEEE1394 bus line. The man-machine interface 61 transmits data inputted as an infrared signal from the remote control device 64 by the user to a control CPU 58. The IC card 65 is inserted into the IC card slot 62. The modem 63 is connected to the accounting server 5 through the telephone line 4. The infrared interface 66 is an interface for controlling the storage device using the infrared signal from the control CPU 58. An infrared signal for controlling storage device control is outputted from an infrared output unit 67 connected to the infrared interface 66 through a predetermined signal line.

The tuner 51 selects a signal at a predetermined reception frequency from reception signals supplied from the terminal T1 based on a set signal from the control CPU 58, conducts modulation processing and error correcting processing to the signal, and outputs an MPEG transport stream. A descrambler 52 receives the MPEG transport stream from the tuner 51, receives key data for the descrambler stored in the IC card 65 through the IC card slot 62 and the control CPU 58, and conducts descrambling using this key data. The transport IC 53 receives a command inputted by the user from the remote control 64 through the man-machine interface 61 and the control CPU 58 and extracts desired TV program MPEG video data and MPEG audio data from the transport stream. The MPEG video decoder 55 converts the MPEG video data supplied from the transport IC 53 to video data which is not yet subjected to data compression. The MPEG audio decoder 54 converts the MPEG audio data supplied from the transport IC 53 to audio data (PCM audio data) which is not yet subjected to data compression. The DA converter 56 converts the audio data supplied from the MPEG audio decoder 54 to an analog audio signal and supplies the signal to the analog audio output terminal T3.

The control CPU 58 controls the entire IRD 12. In this case, operational memories 58a and 58b are connected to the control CPU 58. The memory 58a, which is a data rewritable memory, stores MHEG data and sound addition information which form the GUI screen from the transport stream received by the tuner 51 and extracted by the transport IC 53. The memory 58b, which is a nonvolatile memory in which programs are installed at the time of manufacturing the IRD 12, stores various programs necessary to start the IRD 12 in advance. The programs stored in the memory 58b includes, for example, resident programs started based on the MHEG data, for conducting processings such as creating the GUI screen and controlling the storage device connected to the IRD 12.

Also, the control CPU 58 receives a command inputted by the user using the remote control device 64 through the man-machine interface 61. The modem 63 is connected to the control CPU 58. Information necessary for accounting is stored in the IC card 65. The information stored in the IC card 65 is fed to the accounting server 5 (see FIG. 1) through the telephone line 4 using the modem 63.

The control CPU 58 creates data for a list page screen, for a music information page screen and for a GUI screen. The screen data thus formed is written in predetermined areas of a buffer memory in the MPEG video decoder 55. As a result, as shown in FIG. 2, the list page screen of songs to be broadcast, the information screen of the respective songs and the GUI screen can be displayed in designated areas of a screen.

Next, the operation of the IRD 12 shown in FIG. 9 will be described.

In the IRD 12 shown in FIG. 9, if a user selects a channel in the music content transmission system which has been described so far, the GUI screen shown in FIG. 2 is displayed on the screen of the television set 14.

During this time, the reception signals inputted to the terminal T1 are supplied to the tuner 51. The tuner 51 selects signals at a predetermined reception frequency from the reception signals based on signal setting from the control CPU 58, conducts modulation and error correction processing on to the selected signals and outputs an MPEG transport stream.

The output of the tuner 51 is supplied to the descrambler 52. Key data for descrambling stored in the IC card 65 is inputted to the descrambler 52 through the IC card slot 62 and the control CPU 58. Using the key data, the MPEG transport stream is subjected to descrambling. The MPEG transport stream which has been subjected to descrambling is fed to the transport IC 53.

A command issued from the remote control device 64 by the user is inputted to the transport IC 53 through the man-machine interface 61 and the control CPU 58. MPEG video data and MPEG audio data for a desired TV program are extracted from the transport stream in accordance with the command and fed to the MPEG video decoder 55 and the MPEG audio decoder 54, respectively.

Figure 10:
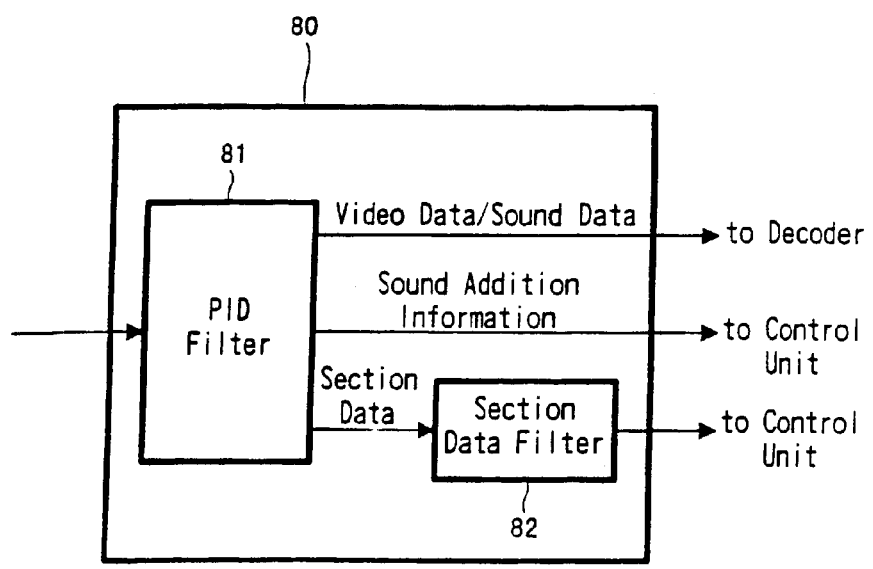
FIG. 10 is a block diagram showing an exemplified constitution of a demultiplexer in accordance with an embodiment of the present invention.

Data separation processing of the transport IC 53 is executed by a demultiplexer contained in the transport IC 53. FIG. 10 shows the constitution of the demultiplexer, which comprises a PID filter 81 and a section data filter 82. The PID filter 81 determines the PID (packet ID) of an inputted transport stream packet, separates the audio data and the video data, and supplies them to their corresponding decoders. Sound addition information is also separated and fed toward the control CPU 58. The section data filter 82 separates and sends desired section data such as MHEG data toward the control CPU 58.

The MPEG video data fed to the MPEG video decoder 55 is converted to video data which is not yet subjected to data compression, converted to a composite video signal by an NTSC conversion block 57 and then outputted to the television set from the analog video output terminal T2. The MPEG audio data fed to the MPEG audio decoder 54 is converted to audio data which is not yet subjected to data compression, converted to an analog audio signal by the DA converter 56 and then outputted to the television set from the analog audio output terminal T3.

A song is selected from the song list 21B on the GUI screen shown in FIG. 2. If the user wishes to listen to the audio data on the selected song, MPEG audio data is extracted from the transport IC 53, decoded by the MPEG audio decoder 54, converted to an analog signal by the DA converter 56 and outputted from the analog audio output terminal T3 to the television set 14 (FIG. 1).

In addition, the download button 28 is depressed on the GUI screen shown in FIG. 2. If audio data is to be downloaded, audio data is extracted from the transport IC 53 and outputted from one of the analog audio output terminal T3, the optical digital output interface 59 and the IEEE1394 interface 60.

That is to say, as shown in FIG. 8, if the recording and reproducing apparatus 13A in compliance with IEEE1394 is connected to the IEEE1394 interface 60, four-fold speed ATRAC data is extracted at the transport IC 53 and fed to the recording and reproducing apparatus 13A in compliance with IEEE1394 through the IEEE1394 interface 60. At this moment, the jacket data compressed by the JPEG method is extracted at the transport IC 53 and fed to the recording and reproducing apparatus 13A in compliance with IEEE1394 through the IEEE1394 interface 60. Furthermore, at the same moment, text data such as data on lyrics, the profile of the artist and the like is extracted at the transport IC 53 and fed to the recording and reproducing apparatus 13A compliant with IEEE1394 through the IEEE1394 interface 60.

If the storage device (of a type which is not provided with an IEEE1394 interface) is connected to the optical digital output interface 59, MPEG audio data is extracted at the transport IC 53 and decoded by the MPEG audio decoder 54. Then, PCM audio data is fed to the storage device through the optical digital output interface 59, which constitution will be described later.

Figure 11:
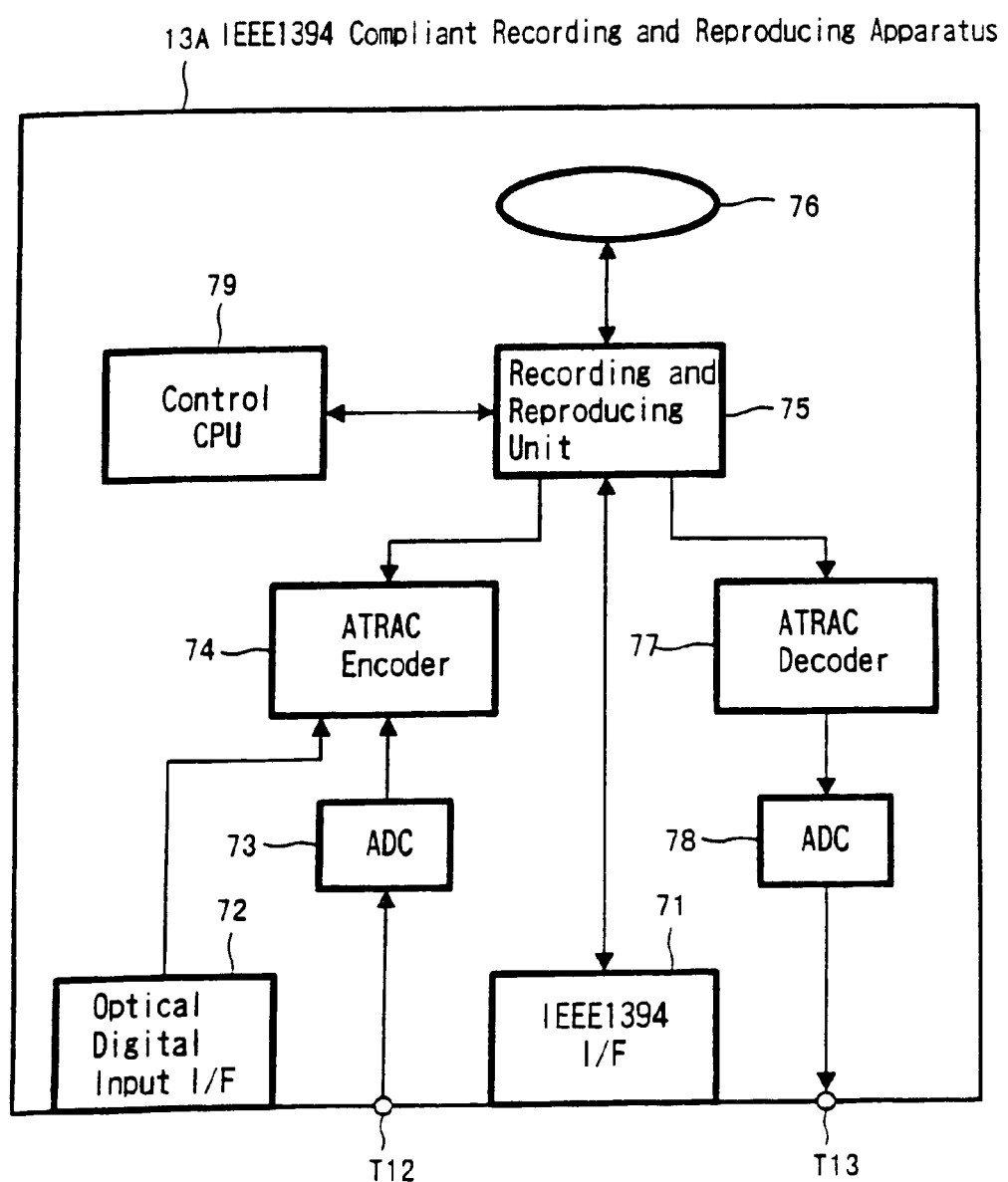
FIG. 11 is a block diagram showing an exemplified constitution of a recording apparatus in accordance with an embodiment of the present invention.

FIG. 11 is a block diagram showing an example of the constitution of the recording and reproducing apparatus 13A compliant with IEEE1394. The recording and reproducing apparatus 13A compliant with IEEE1394 is provided with an IEEE1394 interface 71, an optical digital input interface 72, an analog audio input terminal T12 and an analog audio output terminal T13. The IEEE1394 interface 71 is directly connected to a recording and reproducing unit 75. The optical digital input interface 72 is connected to the recording and reproducing unit 75 through an ATRAC encoder 74. The analog audio input terminal T12 is connected to the ATRAC encoder 73 through an A/D converter 73. The analog audio output terminal T13 is connected to the recording and reproducing unit 75 through a D/A converter 78 and an ATRAC decoder 77. A disk (magneto-optical disk) 76 is mounted at the recording and reproducing unit 75 and the disk 76 is subjected to a recording and reproduction processing. Although not shown in FIG. 11, also provided is a control CPU for controlling the overall recording and reproducing apparatus 13A compliant with IEEE1394 and a man-machine interface.

Next, a description will be given to the operation of the recording and reproducing apparatus 13A compliant with IEEE1394 during recording.

If the IEEE1394 interface 71 is connected to the IEEE1394 interface 60 of the IRD 12 shown in FIG. 9, the audio data on songs, text data on lyrics and the like, and static image data on jackets and the like fed from the IEEE1394 interface 60 are inputted from the IEEE1394 interface 71 and recorded on the disk 76 by the recording and reproducing unit 75. As will be described later, respective items of data are recorded on the disk 76 in the extended MD format at this moment. In addition, copyright information on each data is also inputted from the IEEE1394 interface 71 and recorded in a corresponding table of contents information (TOC) area.

If PCM audio data is inputted from an external side to the optical digital input interface 72, the PCM audio data inputted is encoded by the ATRAC encoder 74 and recorded on the disk 76 by the recording and reproducing unit 75.

If an analog audio signal is inputted from an external side to the analog audio input terminal T12, the analog audio signal inputted is converted to a digital signal by the AD converter 73, encoded by the ATRAC encoder 74 and then recorded on the disk 76 by the recording and reproducing unit 75.

That is, in the recording and reproducing apparatus 13A compliant with IEEE1394, only if the apparatus 13A is connected to the IRD 12 through the IEEE1394 interfaces, lyric data and static image data on jackets as well as audio data on songs are recorded on the disk. If the apparatus 13 is connected thereto through the optical digital interface or at the analog audio output terminal, only audio data is recorded on the disk.

During reproduction, a reproduction signal can be outputted from the IEEE1394 interface 71 or the analog audio output terminal T13. If the reproduction signal is outputted from the IEEE1394 interface 71 and not only audio data on songs but also data on the lyrics of the songs and that on the jackets thereof are recorded on the disk 76, it is possible to output music data to audio equipment (such as an amplifier) in compliance with IEEE1394, to display the lyric data and jacket data on a display in compliance with IEEE1394 and to print them out by a printer in compliance with IEEE1394.

As stated above, the recording and reproducing apparatus 13A compliant with IEEE1394, to which the present invention may be applied, is capable of recording and reproducing not only audio data on songs but also data on the lyrics of the songs and data on the jackets thereof.

Figure 12:
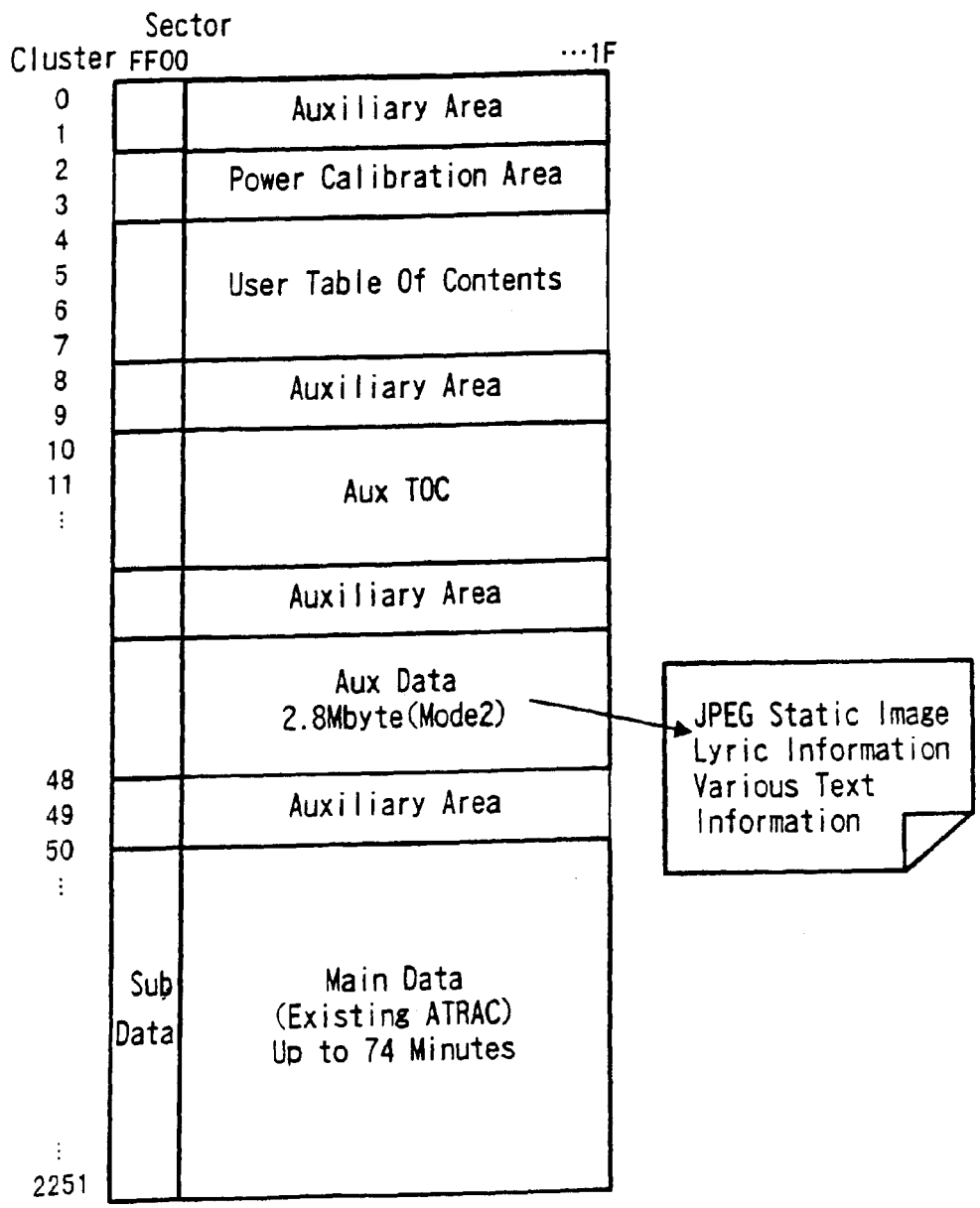
FIG. 12 is an explanatory view showing an exemplified state in which data is recorded on a disk in accordance with an embodiment of the present invention.

The above-described recording and reproduction can be carried out by using an extended MD format shown in FIG. 12. As shown therein, audio data on songs is recorded in a Main Data area by the ATRAC method. This is the same as the existing MD format. The ATRAC audio data up to 74 minutes is recorded in the Main Data area. Table of contents information such as recording positions of the respective songs and auxiliary TOC information such as copy prohibition information on the respective songs are recorded in a User Table Of Contents area for the audio data recorded on the Main Data area. In the extended MD format, the above-described jacket data (static image data), lyric data (text data) and the like are recorded in a 2.8 Mbyte Auxiliary Data area. TOC information on the data recorded in this Auxiliary Data area is recorded in an Auxiliary TOC area. At this moment, auxiliary TOC information such as copy prohibition information for the static image data and text data is recorded in the Auxiliary TOC information area. Thus, if the extended MD format is employed, it is possible to record and reproduce not only audio data on songs but also jacket data and lyric data. It is also possible to maintain compatibility with the existing MD format.

Next, a description will be given to the processing for downloading ATRAC audio data on songs, which is a music program, and jacket data and lyric data as sound addition information in a receiving device with reference to the flow chart of FIG. 13.

First, a user selects an EMD (Electric Music Download) channel, i.e., a music broadcast channel allowing downloading music data, as stated so far, in the IRD 12 (in a step 101). Specifically, while looking at an EPG screen displayed on the television set 14, the user issues a channel selection command to the remote control device 64. In the IRD 12, the control CPU 58 receives the user's channel selection command through the man-machine interface 61, transmits a channel setting signal to the tuner 51 to thereby set a desired channel.

If this channel is selected, the control CPU 58 determines whether or not MHEG data for creating a GUI screen (list screen) exists on the selected channel while referring to section data referred to as PMT (Program Map Table) (in a step 102). If no MHEG data for GUI screen exists, the CPU 58 determines that the selected channel is not for download processing in this embodiment and finishes the processing. If the channel from which the above-stated ATRAC audio data is transmitted is selected, MHEG data for GUI screen exists. The control CPU 58 then starts a program, prepared in advance in the operational memory 58b, for interpreting MHEG data and interprets the received MHEG data (in a step 103).

Thereafter, based on the interpreted MHEG data, the control CPU 58 creates image data for the GUI screen, supplies the image data to the decoder 55 and causes the data to be displayed on the screen of the television set 14 connected to the IRD 12 (in a step 104). The GUI screen displayed at this moment is a screen shown in, for example, FIG. 2. Here, the control CPU 58 stands by until the operation of selecting a song displayed on the screen and that of downloading the selected song are conducted by the key operation of the remote control device 64 (in a step 105). If a remote control signal corresponding to the operation of depressing a portion 28 on which 'download' is indicated is supplied, the CPU 58 starts a get device program among the resident programs prepared in advance in the memory 58*b*, acquires the equipment ID of the storage device 13A connected by the IEEE1394 bus line using the program, and carries out processing for passing the MHEG data to the execution processing unit (in a step 106). An equipment ID means an identification code of predetermined bits (64 bits in this embodiment) allotted in advance to an equipment connected by the IEEE1394 bus line. An equipment manufacturer code, an equipment type code, an equipment serial code and the like are set into a predetermined standard arrangement. By determining the equipment ID by means of the program prepared in the memory 58*b*, the control CPU 58 can know the type and function of the connected equipment. The details of the processing for acquiring an equipment ID by mean of a resident program will be described later.

If the control CPU 58 acquires the equipment ID of the storage device connected to the IRD 12, the CPU 58 creates GUI data for displaying a list of the equipment connected thereto based on the equipment ID and supplies the GUI data to the decoder 55 to thereby display the GUI data on the screen of the television set 14 connected to the IRD 12 (in a step 107). Here, the control CPU 58 stands by until the operation of selecting the equipment displayed on this screen is carried out by the key operation of the remote control device 64 (in a step 108). If a remote control signal corresponding to the operation of selecting this equipment is supplied, the CPU 58 stands by until the ATRAC data on the song for which the download command is issued by the user is received. When reception timing comes, the ATRAC data on the song, static image data (JPEG data) such as data on the jacket of the song and text data such as lyric data are fed to the selected equipment (storage device) from the IEEE1394 interface 60 through the bus line 16. The data transmitted from the IEEE1394 interface 60 is allotted a node ID set to the selected equipment as a transmission destination address. Also, the ATRAC data which is the audio data on the song is subjected to isochronous transfer (synchronous transfer). JPEG data and text data are subjected to asynchronous transfer. Control data for executing processing for recording ATRAC data to be transmitted in the transmission destination equipment is also subjected to asynchronous transfer. By so doing, the data fed to the bus line 16 is recorded on the connected equipment, i.e., in this embodiment, the disk mounted at the recording and reproducing apparatus 13A compliant with IEEE1394 in a state shown in FIG. 12.

The control CPU 58 determines whether or not the download of all of the data on the songs selected by the IEEE1394 bus line 16 is finished (in a step 110). If the CPU determines the download is finished, it then determines whether or not a command to download another song is issued (in a step 111). If the latter command is issued, the CPU 58 conducts processing for downloading the song back in the step 109. If the CPU 58 determines that the download of all of the selected songs is finished, the download processing is finished. It is noted that if the ATRAC audio data is pay data, predetermined accounting processing is carried out at the time of downloading the ATRAC audio data and the like (which accounting processing will not be described in detail herein).

Figure 14:
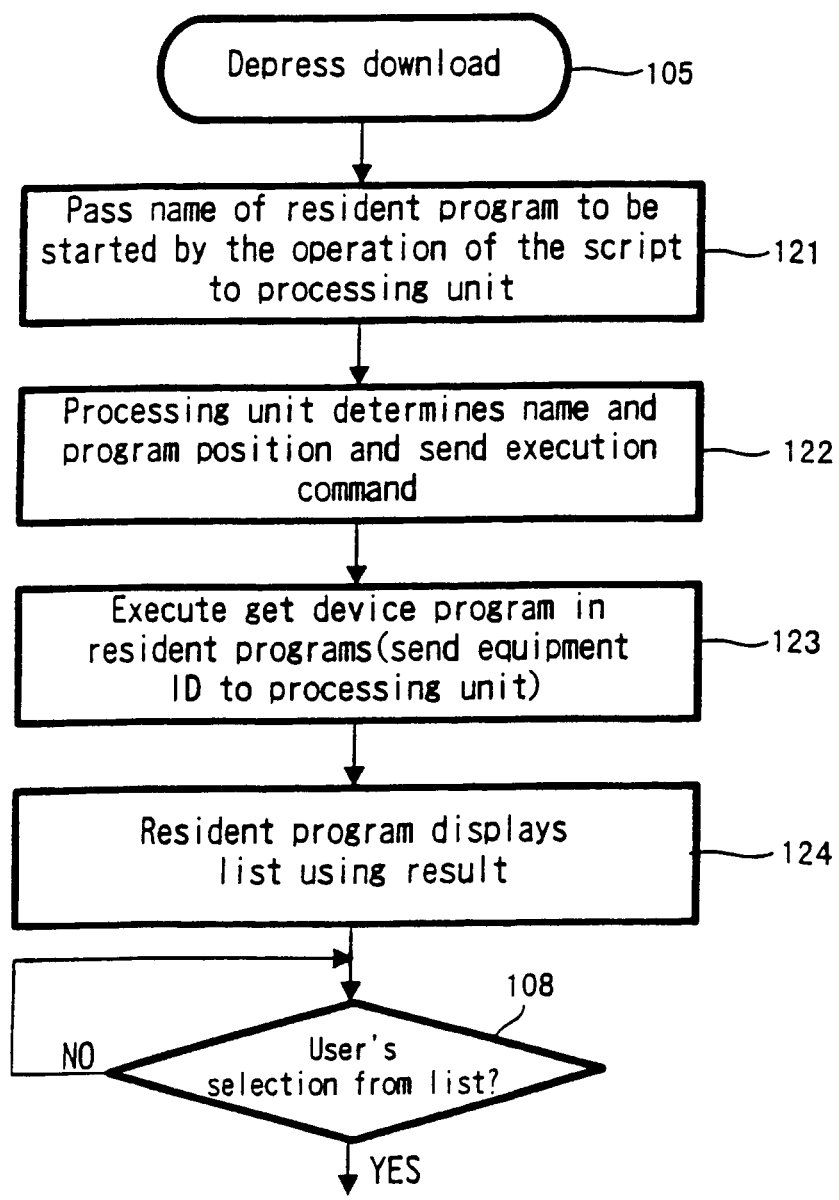
FIG. 14 is a flow chart showing the detail of exemplified processing in a case where a download command is issued in accordance with an embodiment of the present invention.
Figure 15:
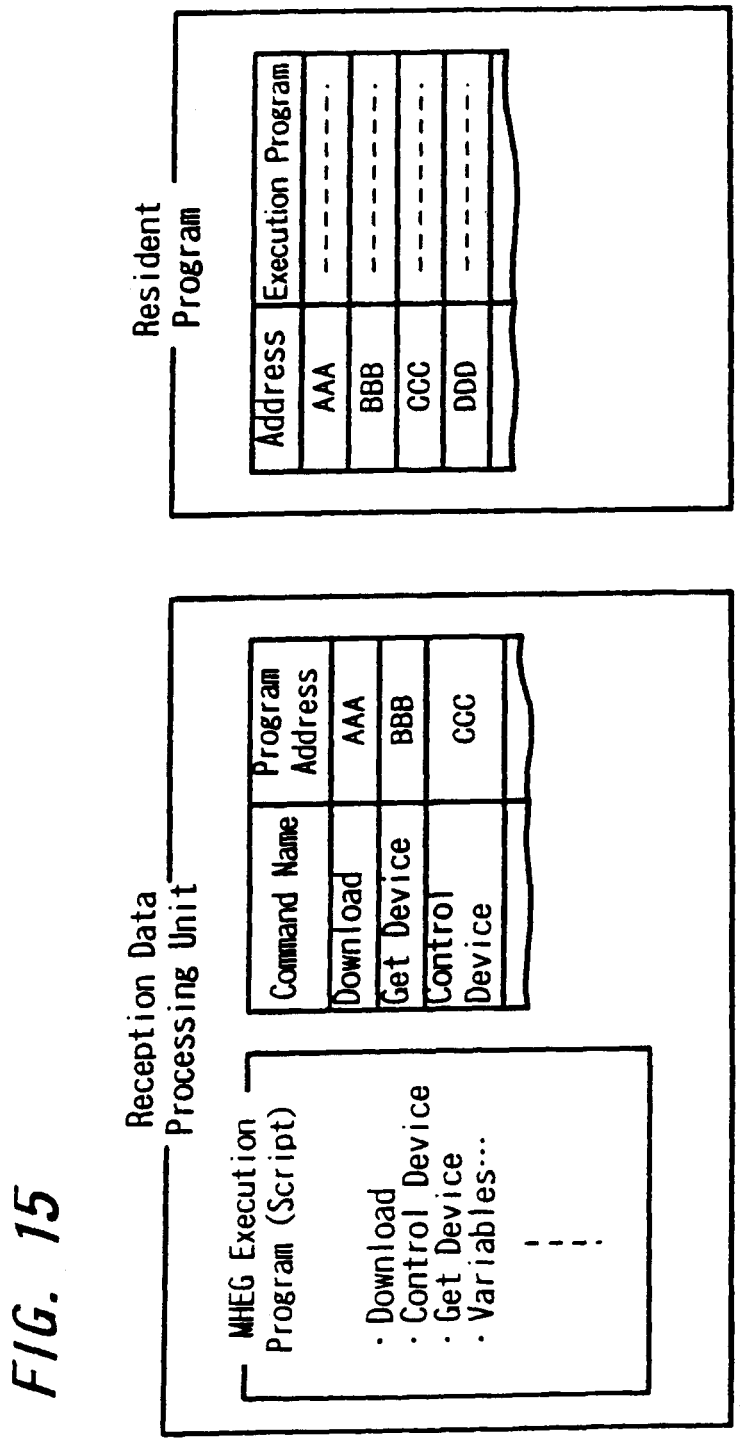
FIG. 15 is an explanatory view showing the relationship between reception data and programs prepared in the IRD in accordance with an embodiment of to the present invention.

Next, the processing for acquiring the equipment ID by means of the resident program shown in the flow chart will be described in detail with reference to the flow chart of FIG. 14 and the view indicating the correspondence of programs with addresses shown in FIG. 15. First, the states of programs will be described with reference to FIG. 15. The received MHEG data is stored in the memory 58*a* connected to the control CPU 58. The MHEG data contains programs (script) created by the broadcasting station. For example, a program for commanding download processing (download program), a program for controlling the connected storage device (control device program), a program for acquiring the equipment ID of the connected storage device (get device program) and variables setting areas set by the respective processings are prepared. In addition, the control CPU 58 sets addresses of resident programs corresponding to commands from the programs for various processings. The memory 58*b* stores resident programs as stated above and programs for executing the commands are prepared in advance at predetermined addresses, respectively.

Description will now be given to the processing for acquiring the equipment ID by using a resident program in a state in which the respective programs are set as stated above, based on the flow chart of FIG. 14. If a command corresponding to the operation of depressing the download button in the step 105 in the flow chart of FIG. 13 is issued, the name of a resident program (get device program in this embodiment) to be started by the operation of the script is passed to an operation processing unit in the control CPU 58 (in a step 121). This operation processing unit determines the recording address at which a corresponding program (get device program) is stored in the memory 58*b*, based on the data on the correspondence of the resident programs prepared by the IRD 12 with addresses and sends a command to execute the program at the address (in a step 122).

By the issuance of the execution command, the get device program stored in the memory 58*b* is executed by the operation processing unit in the control CPU 58 (in a step 123). By executing this get device program, the data for requesting the return of the equipment ID is transmitted from the IEEE1394 interface 60 to all the nodes (equipment) connected to the interface 60 by the bus line by means of, for example, asynchronous transfer. All of the nodes, at which the data is received, return the equipment IDs allotted thereto to the IRD 12 through the bus line by means of asynchronous transfer and the returned data is supplied to the control CPU 58 from the IEEE1394 interface 60. If the equipment IDs are transmitted to the control CPU 58, the control CPU 58 determines the types of the equipment from the transmitted equipment IDs.

At this moment, if there is provided an equipment (such as the IEEE compliant recording and reproducing apparatus 13A connected to the IRD 12 as shown in FIG. 8) serving as a storage device capable of recording ATRAC audio data, then the control CPU 58 creates image data for displaying a list of the equipment on the screen using the resident program and supplies the image data to the decoder 55 to thereby display the data on the screen of the television set 14 connected to the IRD 12 (in a step 124). As for the display of the equipment list, the names of types (such as abbreviations of type names including MD, DVD, PC and the like) of the equipment which are determined from the equipment IDs are displayed. If a plurality of equipment have the same name, number added names such as MD1 ad MD2 are displayed. In some cases, more detailed information such as the names of manufacturers may be displayed. The step 108 of user's selecting the equipment and the following steps are the same as those described with reference to the flow chart of FIG. 13.

By conducting these processings, if the equipment serving as a storage device capable of recording ATRAC audio data is connected to the IRD 12 through the IEEE1394 bus line, processing for creating a list of equipment connected thereto is started based on the MHEG data transmitted from the broadcasting station together with the ATRAC audio data. Since the processing is executed by the resident program prepared in advance in the IRD 12, the list is displayed and the equipment to which the ATRAC audio data and the like are downloaded can be easily selected. Although the list is apparently displayed by the IRD 12 from the MEHG data transmitted from the broadcasting station, the detail of the processing for acquiring the equipment ID is actually executed by the resident program prepared in the IRD 12 and the equipment ID acquisition processing is appropriately conducted based on the actual constitution of the IRD 12. If, in particular, using the IEEE1394 bus line, a large number of equipment (such as 64 equipment) can be connected to the IRD, so that the selection processing in a case a plurality of equipment is connected to the IRD 12 through the bus line, can be efficiently conducted based on the displayed list.

Figure 13:
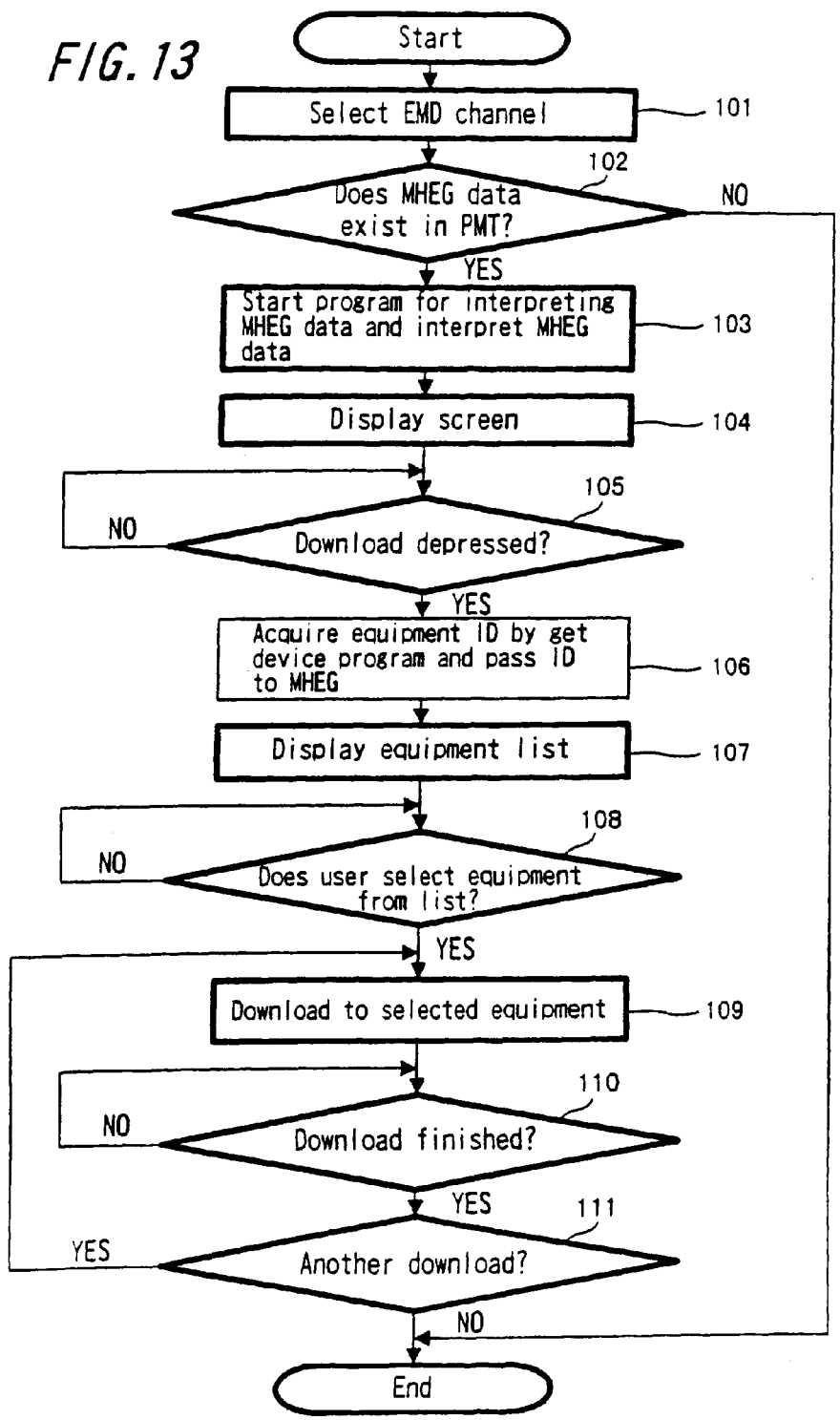
FIG. 13 is a flow chart showing an example of download processing in respect of a predetermined channel in accordance with an embodiment of the present invention.
Figure 16:
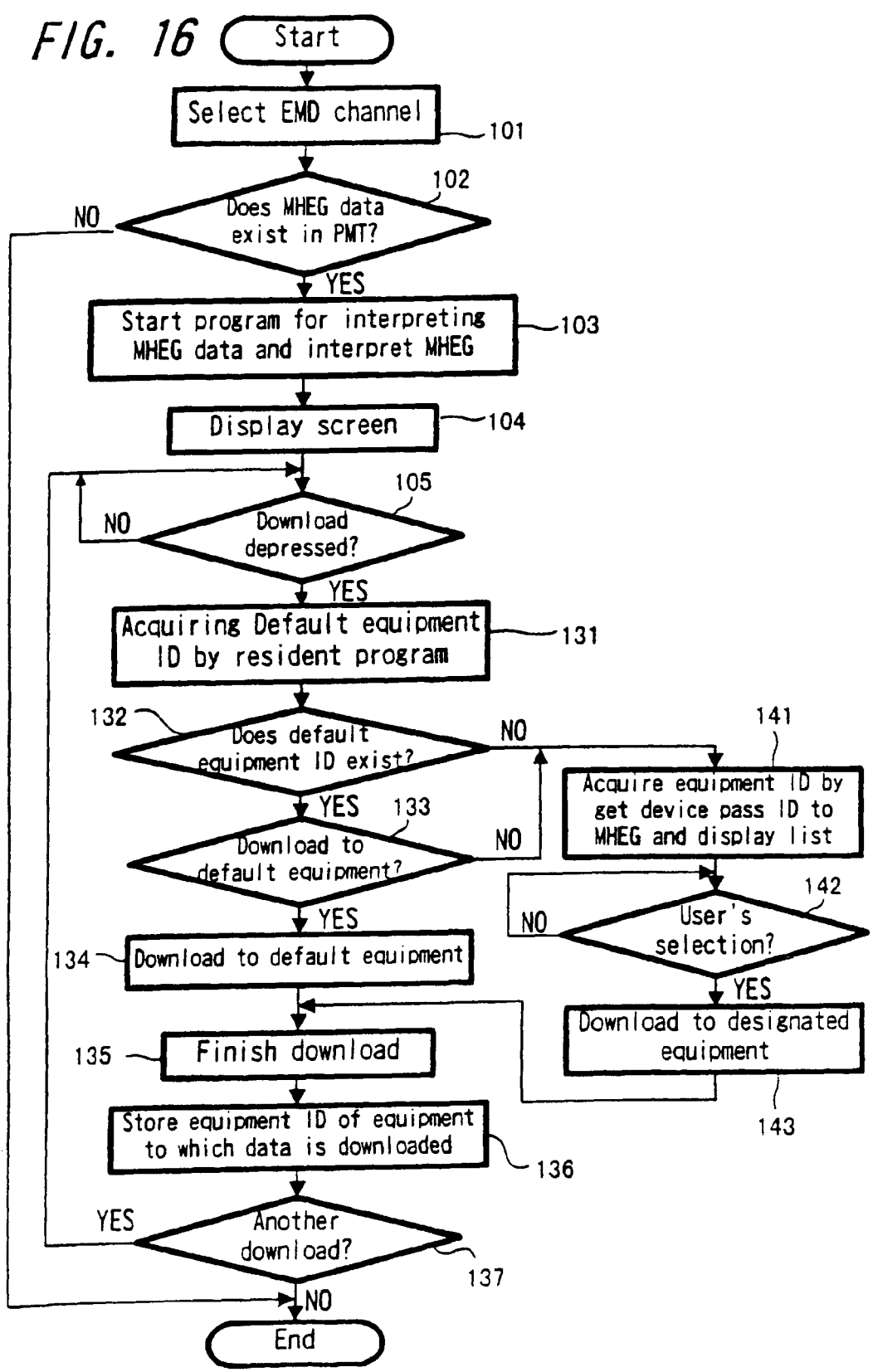
FIG. 16 is a flow chart showing another exemplified download processing in accordance with an embodiment of the present invention.

The processings shown in the flow chart of FIG. 13 indicate that the equipment IDs are acquired and a list of all the connected equipment is displayed whenever download processing is selected. However, the equipment ID or the like of a selected equipment may be stored so that the equipment having the stored ID can be preferentially used in the next download processings. The flow chart of FIG. 16 shows these processings. The step 101 in which the user selects an EMD channel in the IRD 12 to the step 105 of downloading the selected song are the same as those in the flow chart of FIG. 13.

Now, if the operation of depressing the download button is conducted in a step 105, the control CPU 58 for controlling in the IRD 12 conducts processing for acquiring the equipment ID by default for the CPU 58 (in a step 131). By executing this processing, it is determined whether or not the default equipment ID, which has bee acquired before, exists in the control CPU 58 (in a step 132). If there is the default equipment ID, the control CPU 58 creates image data for confirming that the data is downloaded to the default equipment and displays the data on the screen of the television set 14, to thereby make the user confirm that the data is downloaded to the default equipment (in a step 133). If the download of data to the equipment is selected by the operation of the remote control device 64, the download of data to the default equipment is executed in the same manner as that in the processing of the step 110 in the flow chart of FIG. 13 already described above (in a step 134). It is then determined that the download processing is finished (in a step 135). The equipment ID of the equipment to which the data is downloaded is stored in a predetermined memory in the control CPU 58 and set as a default ID (in a step 16). Thereafter, it is determined whether or not another data to be downloaded exists (in a step 137). If it exists, the processing goes back to the step 105. If it does not, the download processing is finished.

If it is determined that the ID of the default equipment does not exist in the step 132 and the download of data to equipment other than the default one is selected in the step 133, the processing goes to a step 141, in which processing for acquiring an equipment ID by the get device program is conducted and a equipment list is displayed based on the acquired equipment ID. Then, an equipment is selected from the list by user's operation (in a step 142) and the download of data to the selected equipment is executed (in a step 143). The processings in the steps 141 to 143 are the same as those in the steps 106 to 109 which have been already described above with reference to the flow chart of FIG. 13. After download starts in the step 143, the processing goes to the step 135 in which the CPU stands by until the download is finished. The equipment ID of the equipment to which data is downloaded is stored in a predetermined memory in the control CPU 58 and set as a default equipment (in a step 136).

In this way, if the ID of the equipment used in the previous download processing is stored as a default in the IRD 12, next time there is no need to conduct processing for acquiring the ID of the equipment connected by the bus line, thereby making it possible to reduce time required for selection processing. In addition, since only the confirmation operation in the step 133 is necessary as the selection operation required of the user, it is possible to make operation quite simple.

Figure 17:
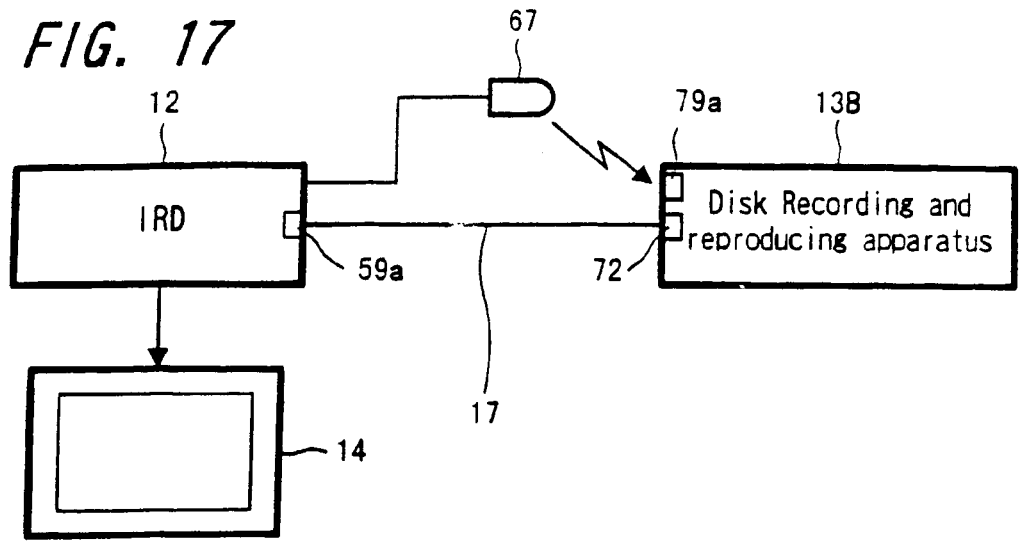
FIG. 17 is a block diagram showing an exemplified connection in accordance with another embodiment of the present invention.

It is noted that although the above-described embodiment concerns processing for downloading data to the storage device connected to the IRD 12 through the IEEE1394 bus line, it is possible to download data to a storage device which is not provided with an IEEE1394 interface. FIG. 17 shows an example of the system constitution of the receiving equipment in the latter case. A disk recording and reproducing apparatus 13B, in which a magneto-optical disk called MD is used, serves as the storage device prepared in the case of FIG. 17. The apparatus 13B is provided with an optical digital input interface 72 which is connected to the optical digital output interface 59 of the IRD 12 by an optical cable 17 (or coaxial cable) to allow transmitting digital data. Also, the apparatus 13 is provided with a man-machine interface 79a at which a remote control signal is inputted by infrared radiation. An infrared output unit 67 connected to the infrared interface 66 (see FIG. 9) of the IRD 12 is arranged in the vicinity of the infrared receiving unit of the man-machine interface 79a.

Figure 18:
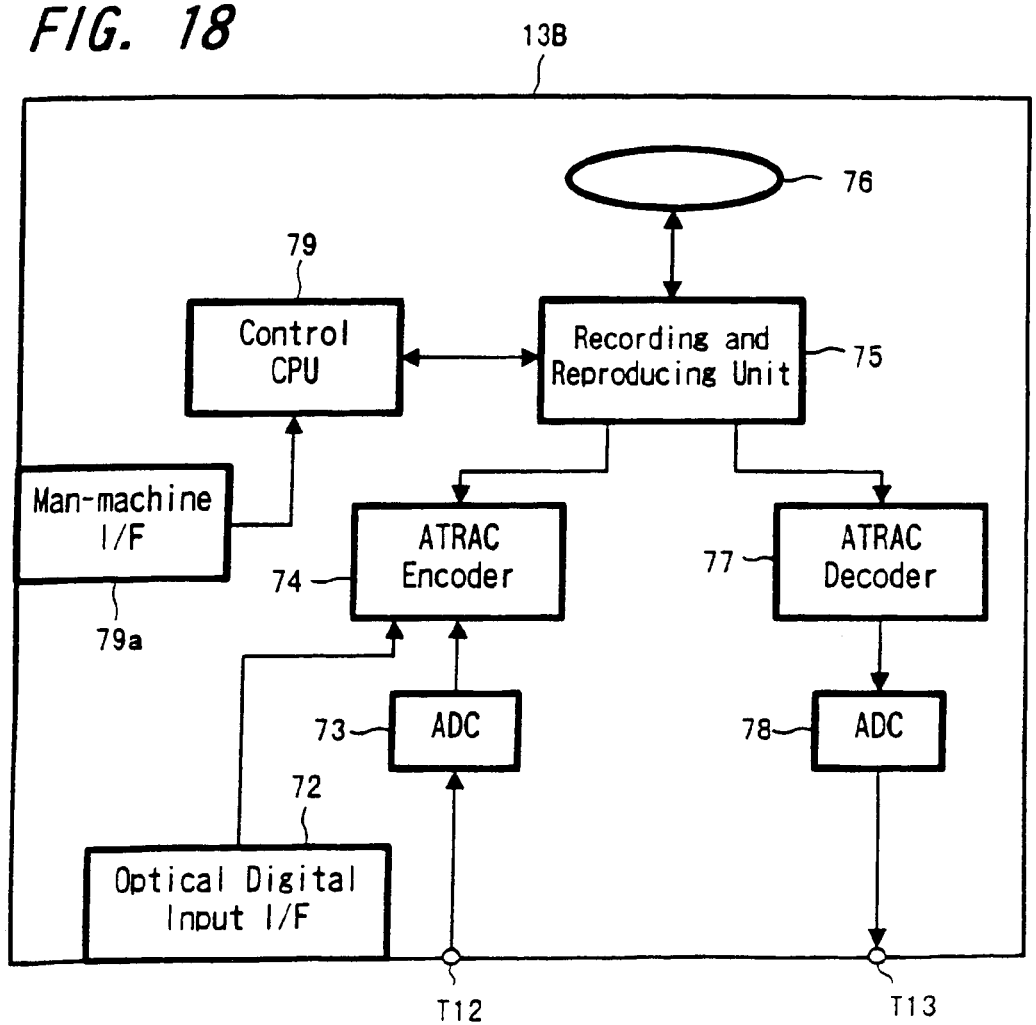
FIG. 18 is a block diagram showing an exemplified constitution of a recording apparatus in accordance with another embodiment of the present invention.

The constitution of the disk recording and reproducing apparatus 13B is shown in FIG. 18. The basic constitution for recording and reproducing data on/from the disk is the same as that of the disk recording and reproducing apparatus 13A shown in FIG. 11. The disk recording and reproducing apparatus 13B, however, lacks an IEEE1394 interface and the man-machine interface 79a at which a remote control signal is inputted is connected to a control CPU 79. The remaining constitution is the same as that of the disk recording and reproducing apparatus 13A shown in FIG. 11.

With this constitution, some setting screen (such as an initial setting screen) is displayed on the television set 14 based on GUI data created by the control CPU 58 in the IRD 12. Selection operation is conducted on the screen by, for example, operating the remote control device 64 to thereby set that the disk recording and reproducing apparatus 13B is connected to the IRD 12 by user's operation. In this case, the type of the connected equipment or the like is set by the user's operation. Based on the information set by the user's operation, the control CPU 58 allots an equipment ID peculiar to the connected equipment. For example, if the ID of the equipment connected by the above-stated IEEE1394 bus line consists of 64 bits, the equipment ID set by the user's operation consists of 65 bits, one bit allotted to the least significant bit of the 64 bits, so that the allotted one bit allows recognizing that the code of 65 bits is allotted by user's setting. The 64 bits other than the least significant one bit are set based on a state set by the user. Alternatively, those other than the least significant one bit may be ignored.

If a download command is issued, the received MPEG audio data is decoded by the audio decoder 54 in the IRD 12 to digital audio data, which is then supplied to the optical digital input interface 72 of the disk recording and reproducing apparatus 13B from the optical digital output interface 59 by the optical cable 17. The control CPU 58 of the IRD 12 creates a command to control recording operation in the recording and reproducing apparatus 13B and outputs the command from the infrared output unit 67 to the man-machine interface 79a of the recording and reproducing apparatus 13B through the infrared interface 66. As a result, the digital audio data supplied through the optical digital cable can be recorded on the disk. Here, the recording and reproducing apparatus 13B encodes and compresses the supplied audio data to ATRAC audio data, and records the encoded ATRAC audio data.

At the timing at which download processing is finished, the control CPU 58 in the IRD 12 creates a command to stop recording in the recording and reproducing apparatus 13B and outputs the command from the infrared output unit 67 to the man-machine interface 79a of the recording and reproducing apparatus 13B through the infrared interface 66. As a result, the operation of recording data on the disk can be stopped.

It is noted that in case of downloading data to the storage device through the connection which does not employ a bus line, the static image data and text data attached to the music data are not transmitted and only the audio data is recorded on the disk.

With this constitution, it is possible to deal with the download of data to a storage device which is not provided with an interface to an IEEE1394 bus line.

The above-stated embodiment concerns processing for downloading audio data to the storage device in which a recording medium referred to as MD (mini-disk) is used. However, the present invention is also applicable to processing for downloading other audio data obtained from the external unit, image data, electronic mail data, various internet content data and the like to the connected storage device based on the program data transmitted simultaneously with the above data from the data transmission side.

Figure 19:
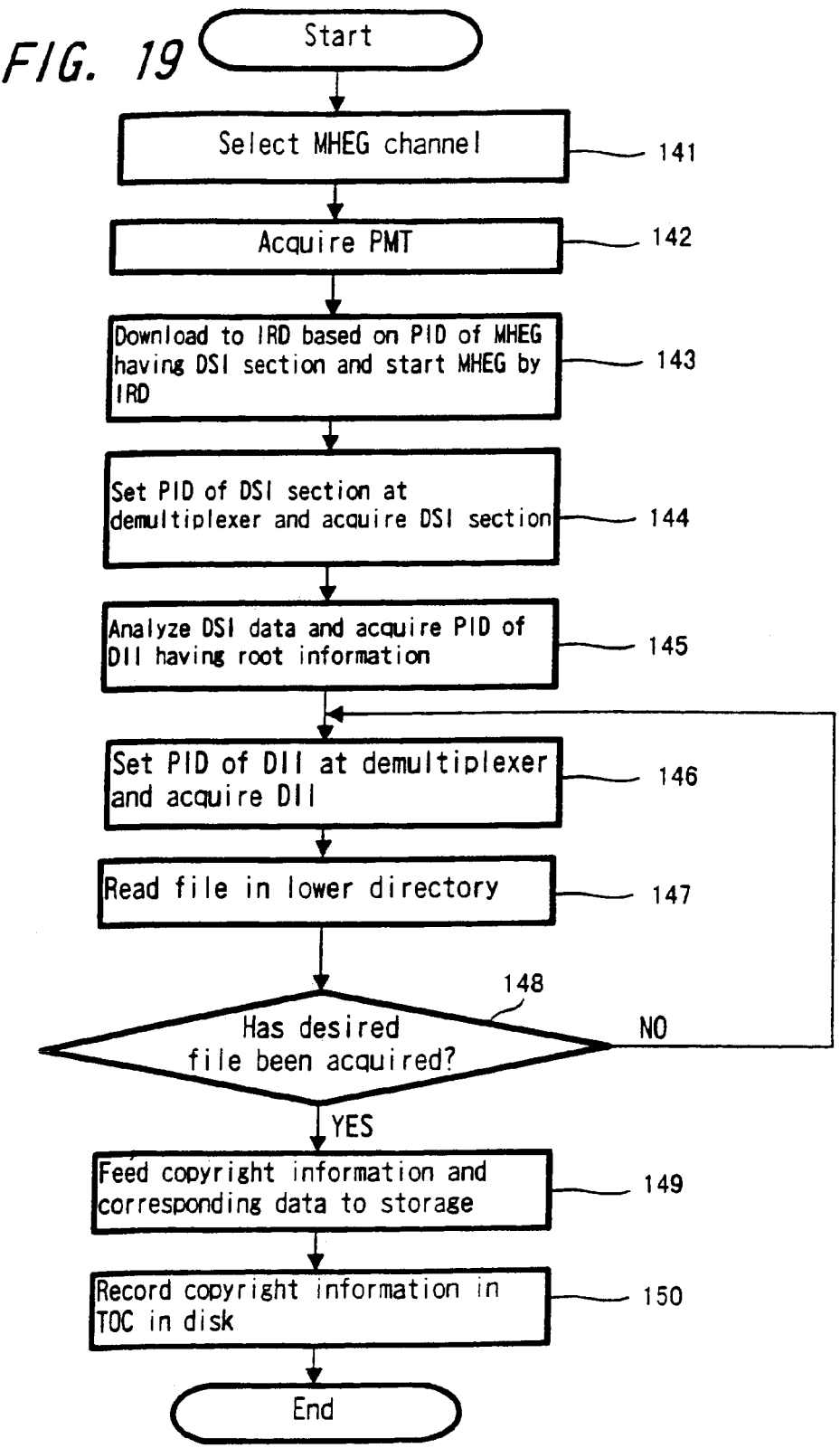
FIG. 19 is a flow chart showing exemplified processing for downloading copyright information in accordance with another embodiment of the present invention.

Next, description will be given to processing for downloading copyright information conducted at the time of downloading the ATRAC audio data received in the IRD 12, with reference to the flow chart of FIG. 19. The processing for downloading copyright information is executed when, for example, data is downloaded to the selected equipment in the step 109 shown in the flow chart of FIG. 13.

First, if an MHEG channel is selected as a channel to be received and selected at the tuner 51 (in a step 141), the PMT (program map table) of the channel is acquired (in a step 142). Here, the MHEG channel is of carousel structure in which data blocks are periodically and repeatedly transmitted, as described in FIG. 7. The PID (packet ID) of a control message referred to as DSI is detected by the transport IC 53 in the IRD 12, corresponding MHEG data is downloaded to the control CPU 58 and a program directed by the MHEG data is started in the control CPU 58 (in a step 143).

The control CPU 58 sets the PID of the DSI at the demultiplexer 80 (see FIG. 10) in the transport ID 53 and acquires DSI data (in a step 144). The control CPU 58 analyzes the acquired DSI data and acquires the PID of the DII having root directory information (in a step 145). The control CPU 58 sets the PID of the DII at the demultiplexer 80 in the transport IC 53 and acquires DII data (in a step 146). Based on the DSI data and the DII data, a file in the lower directory to be transmitted is read (in a step 147). The control CPU 58 determines whether or not necessary, desired data could be acquired based on the data thus read (in a step 148). The data necessary at this moment are copyright information on the audio data on the songs, for which a download command is issued in the processing in the flow chart of FIG. 13, and data attached thereto (static image data, text data and the like). If the copyright information cannot be read, processing for re-reading data is conducted back in the step 146.

If the copyright information on the respective data can be read in the step 148, the copyright information read therein is allotted to the respective items of data (audio data, static image data, text data), and fed to the disk in the selected storage device (disk recording and reproducing apparatus 13A in this embodiment) through the IEEE1394 bus line (in a step 149). In the disk recording and reproducing apparatus 13A to which the data is fed through the bus line, the respective items of data are recorded on the disk in, for example, the extended MD format shown in FIG. 12 (in a step 150). Namely, the ATRAC audio data on the songs are recorded in the Main Data area in the extended MD format, copy information based on the copyright information as well as time information on the respective songs are recorded in the TOC information area, the static image data and text data on the respective songs are recorded in the Auxiliary Data area, and TOC information on the static image data and text data and copy information based on the copyright information are recorded in the Auxiliary TOC area.

As for the relationship between the copyright information transmitted from the transmission side and the copy information recorded on the recording medium (digital), if, for example, the transmitted copyright information is information for prohibiting digital copy, copy information to be recorded in accordance with the data becomes a digital copy prohibiting code. If the transmitted copyright information is information for permitting digital copy for a predetermined time (such as once), copy information to be recorded in accordance with the data becomes a code for permitting digital copy once. If the transmitted copyright information is information indicating that digital copy is not restricted, copy information to be recorded in accordance with the data becomes a code indicating that digital copy is not restricted.

These series of processings are conducted if the IRD is set to a state ensuring correct accounting processing. If the IRD 12 is not set so, data such as audio data is not transmitted to the recording apparatus from the IRD 12.

In the download processing shown in the flow chart of FIG. 13, if the control CPU 58 determines from the equipment IDs that the recording apparatus selected in the step 108 to execute download processing is a recording apparatus in which data is recorded on a recording medium in a format which does not permit digital copy restriction processing, then it is controlled that data having a copyright (data which reproduction is restricted) is not outputted from the IEEE1394 interface 60. For example, like a hard disk recording and reproducing apparatus included in PC unit as a recording and reproducing apparatus to be downloaded, when the apparatus is the apparatus which can basically conduct digital copy to other recording medium after recording to the recording medium, it is controlled that data on a song having copyright is not transmitted to the recording and reproducing apparatus freely. If the MD (mini-disk) stated above is a recording and reproducing apparatus 13A, the MD format is constructed such that digital copy restriction processing can be appropriately conducted between the reproducing apparatus dealing with the MD and the other recording apparatus based on the copy information recorded in the TOC information, whereby copyright can be protected.

If data is downloaded to the storage device connected to the IRD based on the copyright information transmitted from the transmission side, the copyright information is also downloaded thereto to thereby record data based on the copyright information as well as data on the songs on the recording medium, thus ensuring appropriate recording processing so as not to violate copyright. In this embodiment, in particular, copyright information on the static image data serving as jacket data and text data such as lyric data attached to the audio data on the respective songs is also individually transmitted, whereby copy restriction processing for the respective recorded data can be appropriately conducted based on the copyrights for the respective data.

The above-described embodiment concerns processing for downloading audio data to the storage device in which the recording medium referred to as MD (mini-disk) is used. However, the present invention is also applicable to a case where, while other audio data obtained from the external unit, image data, electronic mail data, various Internet content data and the like are downloaded to the connected storage device and recorded on the disk, copyright information transmitted simultaneously with the above data from the data transmission side is recorded.

Next, a description will be given to processing for retrieving a desired song at the time of downloading ATRAC audio data and the like received in the IRD 12. First, the processing for retrieving a song is executed as follows. If the operation of the remote control device 64 corresponding to that of depressing the recording reservation button 25 on the screen is carried out in a state shown in, for example, FIG. 2 in which the GUI screen is displayed, the control CPU 58 detects that an infrared signal is inputted by the man-machine interface 61 by the above operation. If the recording reservation button 25 is depressed, the GUI screen is switched under the control of the control CPU 58 and a list of songs which can be reserved is displayed on the screen of the television set 14.

Figure 21:
FIG. 21 is an explanatory view showing the constitution of text data such as the name of a song in accordance with an embodiment of the present invention.

The list is displayed based on, for example, text data indicating the titles of songs and the names of performers. The text data is transmitted in a packet different from that of the text data indicating lyrics of the songs as stated above. As shown in, for example, FIG. 21, text data on one song consists of a text data string having a character string of the name of the performer (artist name), a tab code, a character string of the title of the song, a line feed code arranged in this order. The text data on all of the songs each having this arrangement in this order and transmitted in a predetermined period of time (e.g., in a day) are fed from the transmission side periodically and repeatedly.

Figure 20:
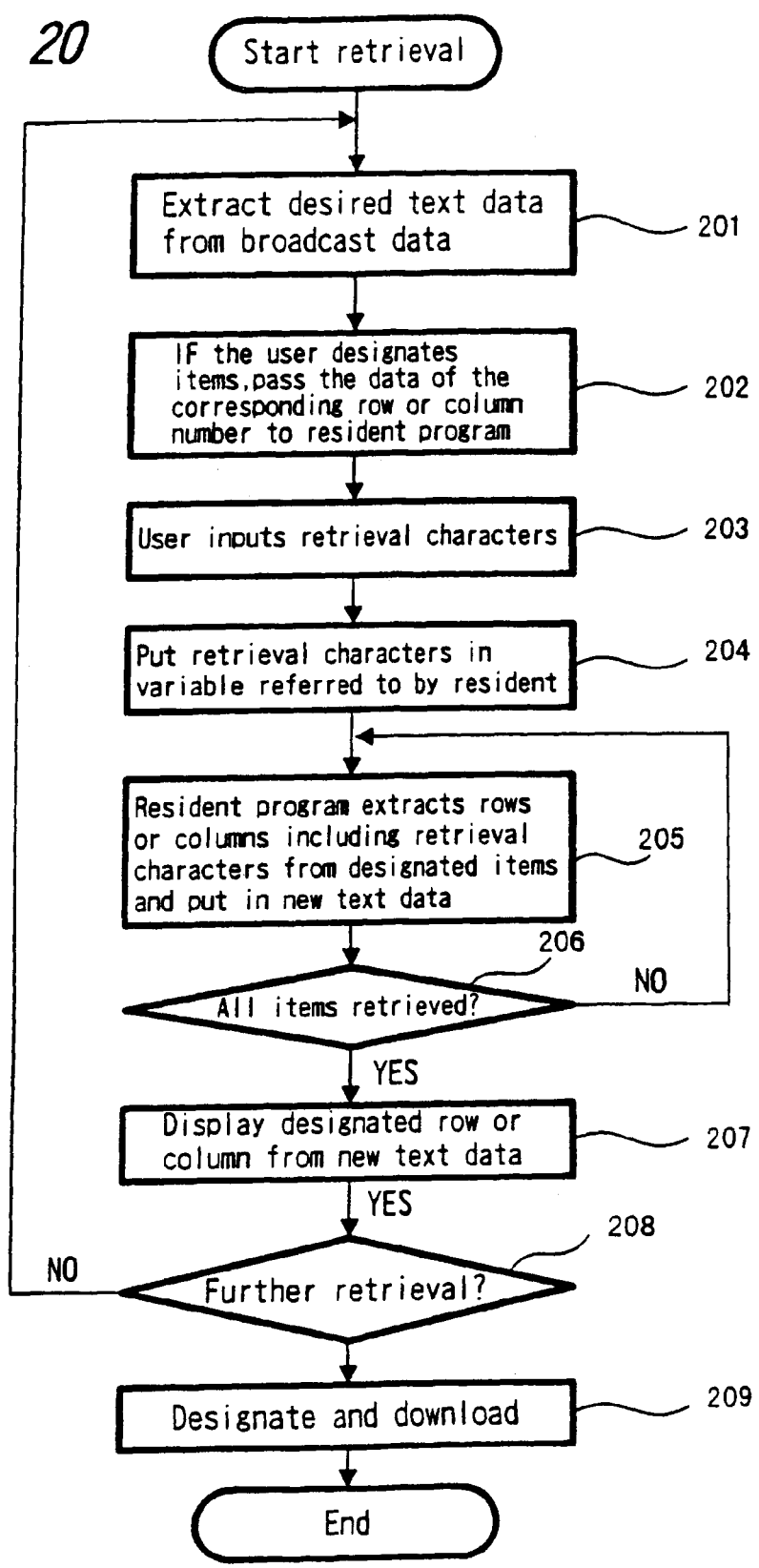
FIG. 20 is a flow chart showing exemplified retrieval processing in accordance with an embodiment of the present invention.

Based on the text data, a list of songs which can be reserved is displayed. It is possible to display the list of songs simply in the order in which the songs are put on the air. However, if the operation of the remote control device 64 corresponding to the depression of a retrieval button (not shown) on the list display screen is conducted and the control CPU 58 detects that an infrared signal is inputted by the man-machine interface 61 by this operation, then retrieval processing based on the text data is started (note that user operations other than this operation are also detected by the control CPU 58). The flow chart of FIG. 20 shows this retrieval processings, which will be described based on FIG. 20. First, the control CPU 58 controls the extraction of text data indicating the names of performers and the titles of songs from the data being broadcast (in a step 201).

If the text data indicating the names of performers and the titles of songs are extracted, they are stored in a memory connected to the control CPU 58. At this moment, if the user designates retrieval items using the remote control device 64 or the like, the control CPU 58 passes the data of the corresponding row or column number to a resident program (in a step 202). Then, if the user inputs character strings to be retrieved by the operation of the remote control device 64 or the like (in a step 203), the character strings to be retrieved are set as variables to be referred to while the resident program is executing retrieval processing (in a step 204).

Now, the resident program conducts retrieval processing, for extracting rows or columns including the character strings to be retrieved from the designated items and the text data including the extracted row or column is set as retrieved data (in a step 205). After this processing, it is determined whether or not all of the items have been retrieved (in a step 206). If there exists data which is not retrieved yet, processing returns to the step 205 in which data retrieval is repeated. If all of the data have been retrieved, the control CPU 58 conducts control processing for displaying a list of characters in the designated row or column from the text data set as retrieved data in the step 205 (in a step 207). As a result of this control processing, image data for displaying the retrieval result is supplied to the decoder 55 and the retrieval result is, thereby, displayed on the screen of the television set 14 connected to the IRD 12.

If the retrieval result includes a plurality of names and titles, it is determined whether or not further retrieval is necessary to retrieve one name and one title from the result (in a step 208). If further retrieval is to be conducted, processing goes back to the step 201. If retrieval processing is finished, input operation for selecting a user's desired song is carried out using the names of performers and titles of songs and a reservation is made for the download of the selected song (in a step 209). This download reservation corresponds to the operation of depressing the download button in the step 105 in the flow chart of FIG. 13. The following steps are the same as those in the step 106 and the following of selecting equipment.

By conducting retrieval processing as stated above, a desired song to be downloaded can be easily selected from the text data indicating the names of performers and the titles of songs transmitted as broadcast signals. Even if many songs are transmitted, the user's desired song can be easily downloaded. In this embodiment, in particular, the text data indicating the titles of transmitted songs and the names of performers are arranged continuously by providing tab codes and line feed codes, so that the data on the target song can be efficiently retrieved from the continuous text data.

The above-described embodiment concerns processing for downloading audio data to the storage device in which the recording medium referred to as MD (mini-disk) is used. However, the present invention is also applicable to a case where, while other audio data obtained from the external unit, image data, electronic mail data, various internet content data and the like are downloaded to the connected storage device and recorded on the disk, retrieval processing is conducted based on the text data attached to the main data among the above data.

In addition, in the above embodiments, the digital satellite broadcasting relaying by means of the artificial satellite is employed as a transmission line from the side of transmitting audio data or the like to the reception equipment. However, other broadcasting transmission lines may be employed. For example, an optical cable or coaxial cable referred to as cable TV may be employed. For example, ATRAC audio data or the like may be transmitted through a predetermined channel on the transmission line directly connecting the transmission side and the reception equipment by a wired line and the same download processing as stated above may be conducted at the reception equipment side. It is also possible to use other transmission lines such as a telephone line.

In the above embodiments, the storage device and the equipment are connected by the IEEE1394 bus line. It goes without saying that other types of data transmission lines may be employed instead of the IEEE1394 bus line.

According to the present invention, the acquisition of information on the second equipment by the first program inputted from the external side to the first equipment is executed by the second program prepared in the first equipment. Due to this, content data obtained from the external side can be easily downloaded to the connected equipment.

According to the present invention, the copyright information as well as data is transmitted to the recording apparatus to thereby make it possible to record the copyright information as well as the data at the recording apparatus side. As a result, copyright can be properly protected.

According to the present invention, the retrieval means can retrieve necessary data based on the received text data string received by the receiving means and the control means can download the retrieved data.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A data receiving apparatus that receives digital audio data, the data receiving apparatus comprising:
   means for generating display data to display a list of digital song titles;
   means for downloading at least one digital song selected from the list of digital song titles by a user, and downloading auxiliary data related to the selected digital song and including at least one piece of artwork for the selected digital song and text data, the auxiliary data being downloaded with the selected digital song;
   a digital interface configured to connect to a reproduction apparatus, including a recording medium, via a direct local and to transfer the selected digital song and the auxiliary data downloaded by the means for downloading to the reproduction apparatus;
   means for acquiring a device ID from each of external devices that are connected to the digital interface and for determining if there is a default device ID, wherein device IDs are allocated to each of the external devices prior to connecting to the digital interface;
   means for automatically transferring, when there is not a default device ID, the downloaded digital song with the auxiliary data related to the downloaded digital song from the data receiving apparatus to a selected one of the external devices; and
   means for recording the selected digital song and the auxiliary data downloaded by the means for downloading in separate areas of a same physical recording medium of the reproduction apparatus through the digital interface.

2. The data receiving apparatus according to claim 1, wherein the means for downloading further downloads copyright information associated with the selected digital song, and
   wherein the means for recording records copy information based on the copyright information on the recording medium, records the selected digital song on the recording medium using synchronous transfer, and records the piece of artwork and the text data about the selected digital song using asynchronous transfer.

3. The data receiving apparatus according to claim 1, further comprising:
   means for performing a billing process on the basis of a reception of the selected digital song,
   wherein the means for recording performs recording on the recording medium after the billing process has been performed by the means for performing the billing process.

4. A method of a data receiving apparatus for receiving digital audio data, the method comprising:
   generating, by the data receiving apparatus, display data that is used to display a list of digital song titles;
   downloading at least one digital song selected from the list of song titles by a user, and downloading auxiliary data related to the digital song and including at least one piece of artwork for the selected digital song and text data, the auxiliary data being downloaded with the selected digital song;
   acquiring a device ID from each of external devices and for determining if there is a default device ID, wherein device IDs are allocated to each of the external devices prior to connecting to a digital interface;
   automatically transferring, when there is not a default device ID, the downloaded digital song with the auxiliary data related to the downloaded digital song from the data receiving apparatus to a selected one of the external devices; and
   recording the selected digital song and the auxiliary data downloaded during the downloading in separate data areas of a same physical recording medium included in a reproduction apparatus connected through a digital interface via a direct local connection, wherein
   the digital interface is configured to transfer the selected digital song and the auxiliary data downloaded during the downloading to the reproduction apparatus.

5. The data receiving and recording method according to claim 4,
   wherein the receiving process further receives copyright information about the piece of artwork and the text data about the selected digital song, and
   wherein the control process performs control so that copy information based on the copyright information is recorded together with respective data, the selected digital song is recorded on the recording medium using synchronous transfer, and the piece of artwork and the text data about the selected digital song are recorded using asynchronous transfer.

6. The data receiving and recording method according to claim 4,
   wherein a billing process is performed on the basis of a reception of the selected digital song, and
   wherein the control process performs recording on the recording medium when a state is set in which the billing process is performed.

7. A non-transitory computer-readable storage medium having embedded therein instructions, which when executed by a computer, cause the computer to perform a method comprising:

generating display data that is used to display a list of digital song titles;

downloading at least one digital song selected from the list of digital song titles by a user, and downloading auxiliary data related to the selected digital song and including at least one piece of artwork for the selected digital song and text data, the auxiliary data being downloaded with the selected digital song;

acquiring a device ID from each of external devices and for determining if there is a default device ID, wherein device IDs are allocated to each of the external devices prior to connecting to a digital interface;

automatically transferring, when there is not a default device ID, the downloaded digital song with the auxiliary data related to the downloaded digital song from the data receiving apparatus to a selected one of the external devices; and recording the selected digital song and the auxiliary data downloaded during the downloading in separate data areas of a same physical recording medium included in a reproduction apparatus connected through a digital interface via a direct local connection, wherein the digital interface is configured to transfer the selected digital song and the auxiliary data downloaded during the downloading to the reproduction apparatus.

8. A data receiving apparatus that receives digital audio data, the data receiving apparatus comprising:

a controller configured to generate display data that is used to display a list of digital song titles, download at least one digital song selected from the list of digital song titles by a user, and download auxiliary data related to the selected digital song and including at least one piece of artwork for the selected digital song and text data, the auxiliary data being downloaded with the selected digital song; and a digital interface configured to connect to a reproduction apparatus, including a recording medium, via a direct local connection and to transfer the selected digital song and the auxiliary data downloaded by the controller to the reproduction apparatus, acquire a device ID from each of external devices that are connected to the digital interface and for determining if there is a default device ID, wherein device IDs are allocated to each of the external devices prior to connecting to the digital interface, and automatically transfer, when there is not a default device ID, the downloaded digital song with the auxiliary data related to the downloaded digital song from the data receiving apparatus to a selected one of the external devices, wherein the controller is further configured to record the selected digital song and auxiliary data downloaded by the controller in separate data areas of a same physical recording medium of the reproduction apparatus through the digital interface.

9. The data receiving apparatus according to claim 8, wherein the digital interface is a local serial bus interface.

10. The data receiving apparatus according to claim 8, wherein the controller is configured to record the selected digital song in a first predetermined data region for storing a plurality of digital songs, and the auxiliary data in a second predetermined data region for storing auxiliary data for the plurality of songs, in a same physical recording medium of the reproduction apparatus.

* * * * *